US009023215B2

(12) United States Patent
Ganzi et al.

(10) Patent No.: US 9,023,215 B2
(45) Date of Patent: May 5, 2015

(54) LOW ENERGY SYSTEM AND METHOD OF DESALINATING SEAWATER

(75) Inventors: Gary C. Ganzi, Lexington, MA (US); Li-Shiang Liang, Harvard, MA (US); Frederick C. Wilkins, Pepperell, MA (US)

(73) Assignee: Evoqua Water Technologies LLC, Warrendale, PA (US)

( * ) Notice: Subject to any disclaimer, the term of this patent is extended or adjusted under 35 U.S.C. 154(b) by 1275 days.

(21) Appl. No.: 12/679,310

(22) PCT Filed: Sep. 22, 2008

(86) PCT No.: PCT/US2008/010969
§ 371 (c)(1),
(2), (4) Date: Jul. 16, 2010

(87) PCT Pub. No.: WO2009/038805
PCT Pub. Date: Mar. 26, 2009

(65) Prior Publication Data
US 2010/0282689 A1    Nov. 11, 2010

Related U.S. Application Data

(60) Provisional application No. 60/974,298, filed on Sep. 21, 2007, provisional application No. 60/981,855, filed on Oct. 23, 2007.

(51) Int. Cl.
*C02F 9/06* (2006.01)
*B01D 61/58* (2006.01)
(Continued)

(52) U.S. Cl.
CPC ............. *B01D 61/58* (2013.01); *B01D 61/44* (2013.01); *B01D 61/48* (2013.01); *B01D 2311/06* (2013.01); *B01D 2313/28* (2013.01);
(Continued)

(58) Field of Classification Search
CPC ......... C02F 1/40; C02F 3/1273; B01D 17/06; B01D 61/00
USPC ........... 210/85, 153, 175, 253, 652, 739, 744, 210/748.01, 748.11; 204/255, 259, 518, 204/519, 520, 522, 524, 533, 536, 537, 627, 204/631, 632, 633, 644; 205/687; 426/422, 426/657
See application file for complete search history.

(56) References Cited

U.S. PATENT DOCUMENTS 6,126,805 A    10/2000   Batchelder et al.
7,604,725 B2 *  10/2009   Ganzi et al. ................... 204/533
(Continued)

FOREIGN PATENT DOCUMENTS

DE    4231028 A1    3/1994
WO    2005044427 A1    5/2005
WO    2008036163 A2    3/2008

*Primary Examiner* — Walter D Griffin
*Assistant Examiner* — Cameron J Allen

(57) ABSTRACT

A low energy water treatment system and method is provided. The system has at least one electrodialysis device that produces partially treated water and a brine byproduct, a softener, and at least one electrodeionization device. The partially treated water stream can be softened by the softener to reduce the likelihood of scale formation and to reduce energy consumption in the electrodeionization device, which produces water having target properties. At least a portion of the energy used by the electrodeionization device can be generated by concentration differences between the brine and seawater streams introduced into compartments thereof. The brine stream can also be used to regenerate the softener.

8 Claims, 16 Drawing Sheets

(51) Int. Cl.
  *B01D 61/44* (2006.01)
  *B01D 61/48* (2006.01)
  *C02F 1/00* (2006.01)
  *C02F 1/44* (2006.01)
  *C02F 1/467* (2006.01)
  *C02F 1/469* (2006.01)
  *C02F 1/42* (2006.01)
  *C02F 103/08* (2006.01)

(52) U.S. Cl.
  CPC ............. *B01D2313/30* (2013.01); *C02F 1/001* (2013.01); *C02F 1/444* (2013.01); *C02F 1/4674* (2013.01); *C02F 1/4693* (2013.01); *C02F 1/4695* (2013.01); *C02F 2001/422* (2013.01); *C02F 2103/08* (2013.01); *C02F 2209/005* (2013.01)

(56) References Cited

U.S. PATENT DOCUMENTS

2003/0089609 A1* 5/2003 Liang et al. .................... 204/627
2010/0126867 A1* 5/2010 Riviello ........................ 204/632

* cited by examiner

LOW ENERGY SYSTEM AND METHOD OF DESALINATING SEAWATER

CROSS REFERENCE TO RELATED APPLICATIONS

This application is a U.S. national stage application and claims the benefit under 35 U.S.C. §371 of International Application No. PCT/US2008/010969 filed on Sep. 22, 2008, entitled LOW ENERGY SYSTEM AND METHOD OF DESALINATING SEAWATER which claims the benefit under 35 U.S.C. §119(e) of U.S. Provisional Application Ser. No. 60/974,298 entitled ENERGY EFFICIENT DESALINATION SYSTEM AND METHOD, filed on Sep. 21, 2007 and of U.S. Provisional Application Ser. No. 60/981,855 entitled ENERGY EFFICIENT DESALINATION SYSTEM, filed on Oct. 23, 2007, each of which is herein incorporated by reference in their entirety and to which this application claims the benefit of priority.

BACKGROUND OF INVENTION

1. Field of Invention

This invention relates to systems and methods desalinating seawater and, in particular, to low energy consuming systems and methods of desalinating seawater involving staged electrodialysis devices and electrodeionization devices having concentration-based potential half-cell pairs.

2. Discussion of Related Art

Sea water desalination was dominated by thermal processes such as vapor compression stills, multiflash distillation and others. Most thermal plants are located where there was abundance of power available for desalting sea water. Electrodialysis was typically used for desalting or desalinating brackish water. Reverse osmosis desalination systems are now more prominent because of such systems have lower power requirements and have lower capital and operating and maintenance costs, compared to thermal systems. The use of energy recovery devices in reverse osmosis systems has further reduced the energy consumption. However, reverse osmosis technology typically require at least about 2.5 kWh/m$^3$. Thermal processes will continue to be high in power consumption due to phase change needed for desalination. If waste heat is available then processes such as membrane distillation may be used with power requirements of as low 1.5 kWh/m$^3$.

SUMMARY OF THE INVENTION

The present use of electrodialysis devices operated at low power consuming conditions and electrodialysis device potential generating half-cell pairs provide desalination system that relatively have lower energy requirements compared to conventional reverse osmosis-based seawater desalination systems.

One or more aspects of the invention can be directed to an electrodeionization device comprising a first depleting compartment fluidly connected to a source of water having dissolved solids therein, the depleting compartment defined at least partially by a cationic selective membrane and a first anionic selective membrane; a first concentrating compartment fluidly connected downstream from a source of a first aqueous liquid having a first dissolved solids concentration, and in ionic communication with the first depleting compartment through the cationic selective membrane; and a second depleting compartment fluidly connected downstream from a source of a second aqueous liquid having a second dissolved solids concentration that is greater than the first dissolved solid concentration, and in ionic communication with the first concentrating compartment through a second anionic selective membrane.

One or more aspects of the invention can be directed to devices for treating water having dissolved ionic species therein. The device can comprise, in some embodiments, a first depleting compartment fluidly connected to a source of the water, and at least partially defined by a first anion selective membrane and a first cation selective membrane; a first concentrating compartment fluidly connected to a source of a first aqueous solution having a first concentration of dissolved solids, in which the first concentrating compartment is typically in ionic communication with the first depleting compartment through one of the first anion selective membrane and the first cation selective membrane; and a second depleting compartment fluidly connected to a source of a second aqueous solution having a second concentration of dissolved solids that is greater than the first concentration of dissolved solids, in which the second depleting compartment is typically in ionic communication with the first concentrating compartment through one of a second cation selective membrane and a second anion selective membrane.

One or more aspects of the invention can be directed to a seawater desalination system. The desalination system can comprise at least one first electrodialysis device including at least one first depletion compartment having a first depletion compartment inlet fluidly connected to a source of seawater, and a first depletion compartment outlet, and at least one first concentration compartment having a first depletion compartment inlet and a first depletion compartment outlet; at least one second electrodialysis device including at least one second depletion compartment having a second depletion compartment inlet fluidly connected to the source of seawater, and a second depletion compartment outlet, and at least one second concentration compartment having a second concentration compartment inlet fluidly connected to the source of seawater, and a brine outlet; at least one ion exchanging unit having an ion exchanger inlet fluidly connected to at least one of the first depletion compartment outlet and the second depletion compartment outlet, and an ion exchanger outlet; and at least one electrodeionization device having a first depleting compartment fluidly connected to the ion exchanger outlet, the depleting compartment defined at least partially by a first cationic selective membrane and a first anionic selective membrane, a first concentrating compartment fluidly connected to the source of seawater, and in ionic communication with the first depleting compartment through the first cationic selective membrane, and a second depleting compartment fluidly connected downstream from the brine outlet, and in ionic communication with the first concentrating compartment through a second anionic selective membrane.

One or more aspects of the invention can involve a desalination system comprising a source of water which can at least partially have or be seawater; a means for selectively reducing a concentration of monoselective species in a first seawater stream to produce a first diluted stream; a means for increasing a dissolved solids concentration in a second seawater stream to produce a brine stream; means for exchanging at least a portion of divalent species for monovalent species in the first diluted stream, wherein the means for exchanging typically has a second diluted stream outlet; and an electrochemical separation device. The electrochemical separation device typically has a depleting compartment fluidly connected to the second diluted stream outlet, and a means for providing a concentration-induced electrical potential in ionic communication with the depleting compartment.

One or more further aspects of the invention can be directed to an electrodeionization device comprising a depleting compartment fluidly connected to a source of water having dissolved solids therein, wherein the depleting compartment defined at least partially by a cationic selective membrane and a first anionic selective membrane, and a concentration half-cell pair in ionic communication with the depleting compartment. The concentration half-cell pair typically comprises a first half-cell compartment fluidly connected to a source of a first aqueous liquid having a first dissolved solids concentration, and in ionic communication with the depleting compartment through one of the cationic selective membrane and the first anionic selective membrane, and a second half-cell compartment fluidly connected downstream from a source of a second aqueous liquid having a second dissolved solids concentration that is greater than the first dissolved solid concentration, and in ionic communication with the first half-cell compartment through a second anionic selective membrane.

One or more still further aspects of the invention can be directed to a method of desalinating seawater comprising reducing a concentration of monovalent species of seawater in a first desalting stage to produce partially desalted water; producing a brine solution from seawater, wherein the brine solution typically has a total dissolved solids concentration that is at least twice the concentration of total dissolved solids in seawater; introducing the partially desalted water into a depleting compartment of an electrically-driven separation device; and creating a concentration-induced electrical potential in a concentration cell pair of the electrically-driven separation device while promoting transport of at least a portion of dissolved species from the partially desalted water in the depleting compartment into a compartment of the concentration cell pair.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing.

In the drawings.

DETAILED DESCRIPTION

Figure 1:
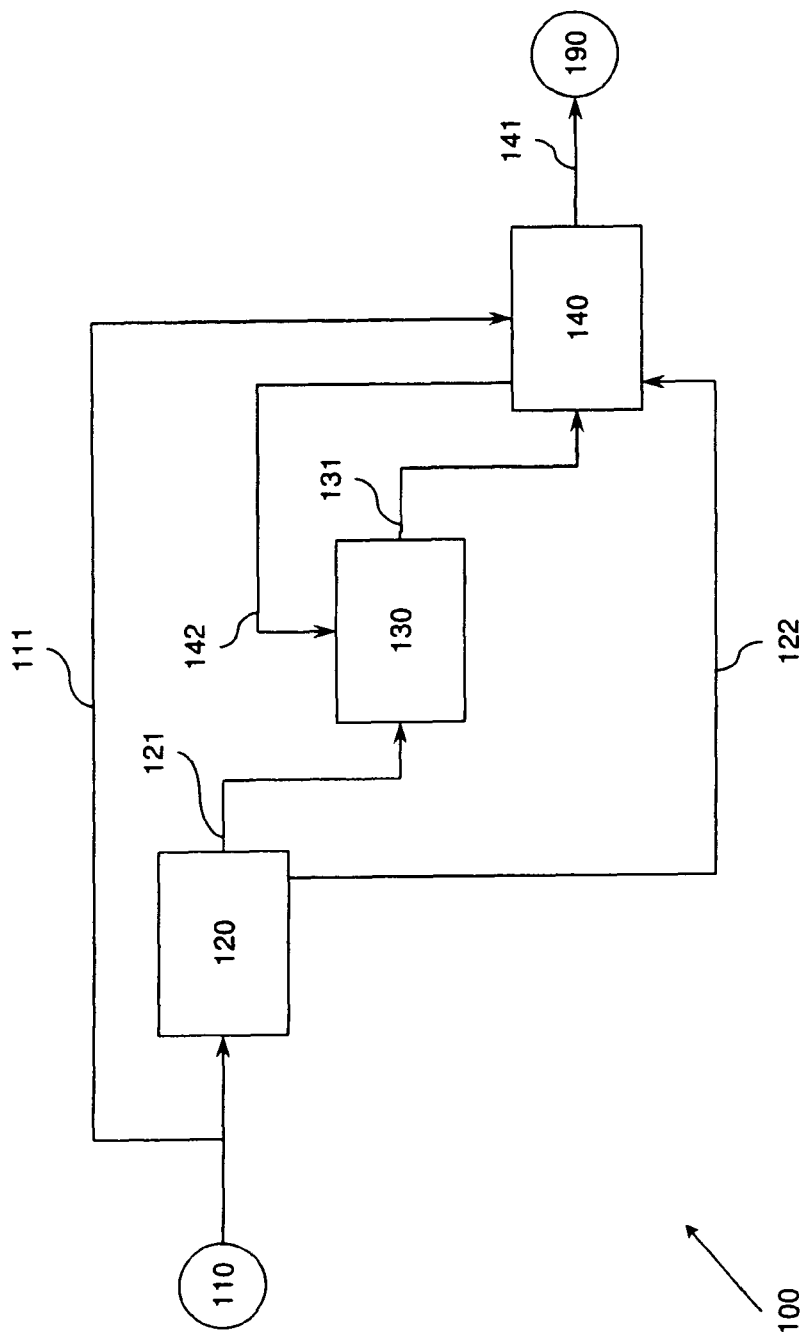
FIG. 1 is a schematic flow diagram of a system in accordance with one or more embodiments of the invention.

The present invention is directed to a treatment system, which in some aspects, embodiments, or configurations, can be a water treatment system. Some particularly advantageous aspects of the invention can be directed to seawater treatment systems or desalination systems and techniques involving seawater treatment or desalination. The systems and techniques of the invention can advantageously provide treated water by utilizing differences in concentrations to create potential or motive conditions that facilitate transport of one or more migratable dissolved solids in the water to be treated. Further aspects of the invention can be directed to systems and techniques that provide potable water from seawater or brackish water.

One or more aspects of the invention can provide potable drinking water that meets or exceeds World Health Organization guidelines, that can be produced from typical seawater feed with a total energy consumption of below 1.5 kWh/m$^3$ of water produced. Other aspects of the invention can be directed to a combined electrodialysis and continuous electrodeionization system and device and novel continuous electrodeionization configuration that utilize concentration differences to facilitate ion separation.

Some embodiments of the invention can involve multiple step processes utilizing electrodialysis (ED) devices to desalinate seawater to a total dissolved solids (TDS) concentration, or salt concentration, in a range of about 3,500 to about 5500 ppm, followed by ion exchange (IX) softening, and final desalination to a TDS level of less than about 1,000 ppm salt content by a novel version of continuous electrodeionization (CEDI).

Our systems and processes of the present invention can involve a unique combination of existing and novel technologies, wherein each component thereof utilized for reducing, or even minimizing, overall energy consumption by advantageous use synergies between the different components and unit operations that aggregately overcomes respective limitations of current ED and CEDI devices. For example, because the energy efficiency of ED devices typically decreases as the product TDS level is reduced below 5500 ppm, typically because of concentration polarization and water splitting phenomena, CEDI devices can be used instead to further desalt water containing such low TDS levels, less than 5500 ppm, at higher comparative efficiency because the latter device utilize ion exchange resin. To address scaling concerns, a softener removes or reduces the concentration of non-monovalent, scale-forming species. The use of monovalent selective membranes in, for example, a second, parallel electrodialysis train, can be used to generate a regenerating stream for the softening stage, which typically has a high concentration of monovalent species, thereby at least reducing, if not eliminating any need for external salt stream storage. Further advantages can include improved water recovery.

Some further aspects of the invention can involve ED and CEDI devices that can be operated at sufficiently low current densities so that concentration polarization and water splitting are limited, which reduces power demand.

The seawater desalination system, for example, can comprise a first treatment stage that preferably reduces a concentration of dissolved species such as one or more dissolved solids. Some particular aspects of the present invention will be described with reference to seawater. The invention, however, is not limited to treating or desalinating seawater and one or more principles thereof can be utilized to treat a liquid having target species to be removed therefrom.

One or more aspects of the invention can be directed to an electrodeionization device comprising a first depleting compartment fluidly connected to a source of water having dissolved solids therein, the depleting compartment defined at least partially by a cationic selective membrane and a first anionic selective membrane; a first concentrating compartment fluidly connected downstream from a source of a first aqueous liquid having a first dissolved solids concentration, and in ionic communication with the first depleting compartment through the cationic selective membrane; and a second depleting compartment fluidly connected downstream from a source of a second aqueous liquid having a second dissolved solids concentration that is greater than the first dissolved solid concentration, and in ionic communication with the first concentrating compartment through a second anionic selective membrane.

In some embodiments of the invention, the first aqueous liquid is seawater, typically having a first dissolved solids concentration of less than about 4 wt %, typically about 3.3 wt % to 3.7 wt % and, in some cases, the second aqueous liquid is brine having a second dissolved solids concentration of at least about 10 wt %. In one or more further particular embodiments, the first depleting compartment is fluidly connected to a source of water having a dissolved solids concentration of less than about 2,500 ppm, or a ratio of the second dissolved solids concentration to the first dissolved solids concentration is at least about 3.

One or more aspects of the invention can be directed to devices for treating water having dissolved ionic species therein. The device can comprise, in some embodiments, a first depleting compartment fluidly connected to a source of the water, and at least partially defined by a first anion selective membrane and a first cation selective membrane; a first concentrating compartment fluidly connected to a source of a first aqueous solution having a first concentration of dissolved solids, the first concentrating compartment in ionic communication with the first depleting compartment through one of the first anion selective membrane and the first cation selective membrane; and a second depleting compartment fluidly connected to a source of a second aqueous solution having a second concentration of dissolved solids that is greater than the first concentration of dissolved solids, wherein the second depleting compartment is typically in ionic communication with the first concentrating compartment through one of a second cation selective membrane and a second anion selective membrane.

In some embodiments of the invention, the device can further comprise a second concentrating compartment fluidly connected at least one of a source of a third aqueous solution having a third concentration of dissolved solids that is less than the second concentration of dissolved solids and the source of the first aqueous solution, the second concentrating compartment in ionic communication with the second depleting compartment through one of the second anion selective membrane and the second cation selective membrane. The second concentrating compartment can, but not necessarily, be ionic communication with the first depleting compartment through the first cation selective membrane. In further configurations in accordance with some aspects of the invention, the device comprises one or more salt bridges that, for example, ionically connect the first depleting compartment and the second concentrating compartment. In other further embodiments of the invention, the device can further comprise a third depleting compartment fluidly connected to at least one of the source of the second aqueous solution and a source of a fourth aqueous solution having a fourth concentration of dissolved solids that is greater than the third concentration of dissolved solids, wherein the third depleting compartment is typically in ionic communication with the second concentrating compartment through a third cation selective membrane. The device can further comprise a third concentrating compartment fluidly connected to at least one of a source of the first aqueous solution, the source of the third aqueous solution, and a source of a fifth aqueous solution having a fifth concentration of dissolved solids that is less than any of the second concentration of dissolved solids and the fourth concentration of dissolved solids, the third concentrating compartment in ionic communication with the third depleting compartment through a third anion selective membrane. The third concentrating compartment can be in ionic communication with the first depleting compartment through the first cation selective membrane and, in some cases, the third concentrating compartment is in ionic communication with the first depleting compartment through a salt bridge. Thus, in some configurations, the device has no electrodes or structures that provides external electromotive potential through the compartments thereof.

In other configurations of the device, the first depleting compartment and the first concentrating compartment are fluidly connected downstream from the same source.

One or more aspects of the invention can be directed to a seawater desalination system. The desalination system can comprise at least one first electrodialysis device including at least one first depletion compartment having a first depletion compartment inlet fluidly connected to a source of seawater, and a first depletion compartment outlet, and at least one first concentration compartment having a first depletion compartment inlet and a first depletion compartment outlet; at least one second electrodialysis device including at least one second depletion compartment having a second depletion compartment inlet fluidly connected to the source of seawater, and a second depletion compartment outlet, and at least one second concentration compartment having a second concentration compartment inlet fluidly connected to the source of seawater, and a brine outlet; at least one ion exchanging unit having an ion exchanger inlet fluidly connected to at least one of the first depletion compartment outlet and the second depletion compartment outlet, and an ion exchanger outlet; and at least one electrodeionization device having a first depleting compartment fluidly connected to the ion exchanger outlet, the depleting compartment can be defined at least partially by a first cationic selective membrane and a first anionic selective membrane, a first concentrating compartment fluidly connected to the source of seawater, and in ionic communication with the first depleting compartment through the first cationic selective membrane, and a second depleting compartment fluidly connected downstream from the brine outlet, and in ionic communication with the first concentrating compartment through a second anionic selective membrane.

In one or more embodiments of the desalination system, at least one of the first concentrating compartment and the second depleting compartment does not contain ion exchange resin.

In other configurations of the desalination system, the at least one electrodeionization device further comprises a second concentrating compartment at least partially defined by the first anionic selective membrane, and having an inlet fluidly connected to the source of seawater, and a third depleting compartment in ionic communication with the second concentrating compartment through a second cationic selective membrane, and having an inlet fluidly connected to at least one of the brine outlet, an outlet of the first concentrating compartment, and an outlet of the second depleting compartment. In some cases, at least one of the first concentrating compartment, the second depleting compartment, the second concentrating compartment, and the third depleting compartment does not contain ion exchange resin.

The seawater desalination system, in some advantageous configurations, can further comprise one or more brine storage tanks, one or more of which can be fluidly connected to at least one of an outlet of the first concentrating compartment and an outlet of the second depleting compartment. One or more of the brine storage tanks can respectively comprise an outlet, any one or more of which can be fluidly connected to or connectable to the at least one ion exchanging unit, exclusively or to other unit operations of the desalination system.

In other configurations, the seawater desalination system can further comprise a third electrodialysis device having a third depletion compartment fluidly connected downstream from the first depletion compartment and upstream of the ion exchanging unit. Further configurations can involve systems that comprise a fourth electrodialysis device having a fourth depletion compartment fluidly connected downstream from the second depletion compartment and upstream of the ion exchanging unit.

In some advantageous configurations of the system, the at least one first electrodialysis device comprises a monovalent selective membrane disposed between the at least one first depletion compartment and the at least one first depletion compartment. Further, the first depleting compartment of the electrodeionization device can contain a mixed bed of ion exchange media, such as ion exchange resin.

Some further aspects of the invention can involve pretreating water, preferably seawater or brackish water. In one or more configurations of the invention, the desalination system can further comprise at least one pretreatment unit operation which can be fluidly connected downstream from the source of water to be treated, which can be seawater, or brackish water, and, preferably, be fluidly connected, or connectable, upstream of at least one of the at least one first electrodialysis device, the at least one second electrodialysis device, and the at least one electrodeionization device. The at least one pretreatment unit operation can comprise at least one subsystem selected from the group consisting of a filtration system, a chlorination system, and a dechlorination system. The pretreatment unit operation can comprise, in some configurations of the system, at least one of a microfilter, a sand filter, and particulate filter.

In some cases, the pretreatment system can also comprise a pressure-driven system that selectively removes divalent species such as sulfate. For example, a nanofiltration system utilizing a FILMTEC™ membrane, from The Dow Chemical Company, Midland, Mich., can be used to reduce the concentration of at least the sulfate species, which should further reduce the power consumption by one or more downstream unit operations, such as any of the electrodialysis devices, and the electrodeionization devices.

In still other configurations of one or more of the systems of the invention, the at least one of the at least one electrodeionization device comprises an anionic species collector, a cationic species collector, and a salt bridge in ionic communication with the anodic and the cathodic collectors. The ionic species collectors can be compartments at least partially defined by ion selective media. When advantageous, at least one of the at least one electrodeionization device, the at least one first electrodialysis device, and the at least one second electrodialysis device comprises an anode compartment fluidly connected downstream from a source of an aqueous solution having dissolved chloride species, the electrode compartment comprising one of a chlorine outlet and hypochlorite outlet. Further configurations can involve at least one of the at least one the electrodeionization device, the at least one first electrodialysis device, and the at least one second electrodialysis device comprising a second electrode compartment comprising a caustic stream outlet.

One or more aspects of the invention can involve a desalination system comprising a source of water which can at least partially have or be seawater; a means for selectively reducing a concentration of monoselective species in a first seawater stream to produce a first diluted stream; a means for increasing a dissolved solids concentration in a second seawater stream to produce a brine stream; a means for exchanging at least a portion of divalent species for monovalent species in the first diluted stream, wherein the means for exchanging can have a second diluted stream outlet; and an electrochemical separation device. The electrochemical separation device typically has a depleting compartment fluidly connected to the second diluted stream outlet, and a means for providing a concentration-induced electrical potential in ionic communication with the depleting compartment.

In some configurations of the desalination system, the means for increasing a dissolved solids concentration in the first seawater stream comprises an electrodialysis device having a depletion compartment fluidly connected to the source of seawater, and a concentration compartment separated from the depletion compartment by a monovalent selective membrane. The means for increasing a dissolved solids concentration in the second seawater stream can comprise an electrodialysis device having a concentration compartment fluidly connected to the source of seawater, and a brine outlet providing the brine stream. The means for providing a concentration-induced electrical potential can comprise a first half-cell compartment fluidly connected to a source of a first half-cell feed stream having a first concentration of total dissolved solids, and a second half-cell compartment fluidly connected to a source of a second half-cell feed stream having a second concentration of total dissolved solids that is greater than the first concentration of total dissolved solids. The first half-cell compartment is typically fluidly connected to a source of seawater and the second half-cell compartment is fluidly connected to a source of brine.

One or more further aspects of the invention can be directed to an electrodeionization device comprising a depleting compartment fluidly connected to a source of water having dissolved solids therein, the depleting compartment defined at least partially by a cationic selective membrane and a first anionic selective membrane; and at least one concentration half-cell pairs in ionic communication with the depleting compartment. The concentration half-cell pair typically comprises a first half-cell compartment fluidly connected to a source of a first aqueous liquid having a first dissolved solids concentration, and in ionic communication with the depleting compartment through one of the cationic selective membrane and the first anionic selective membrane, and a second half-cell compartment fluidly connected downstream from a source of a second aqueous liquid having a second dissolved solids concentration that is greater than the first dissolved solid concentration, and in ionic communication with the first half-cell compartment through a second anionic selective membrane.

In some configurations of the electrodeionization device, the first aqueous liquid is seawater. The second aqueous liquid can be a brine stream having a second dissolved solids concentration of at least about 10 wt %. Thus, in some embodiments of the invention, the second dissolved solids concentration to the first dissolved solids concentration is in a concentration ratio that is at least about three.

One or more still further aspects of the invention can be directed to a method of desalinating seawater comprising reducing a concentration of monovalent species of seawater in a first desalting stage to produce partially desalted water; producing a brine solution from seawater, the brine solution having a total dissolved solids concentration that is at least twice the concentration of total dissolved solids in seawater; introducing the partially desalted water into a depleting compartment of an electrically-driven separation device; and creating a concentration-induced electrical potential in a concentration cell pair of the electrically-driven separation device while promoting transport of at least a portion of dissolved species from the partially desalted water in the depleting compartment into a compartment of the concentration cell pair. The method can further comprise passing at least a portion of the seawater through a nanofiltration system before reducing the concentration of monovalent species of seawater in the first desalting stage.

The method can further comprise, in some approaches, replacing at least a portion of dissolved non-monovalent species in the partially desalted water with dissolved monovalent species. Reducing the concentration of the monovalent species of seawater can involve selectively reducing the concentration of dissolved monovalent species in an electrodialysis device. Producing the brine solution can involve promoting transport of at least a portion of dissolved species from the seawater into a second seawater stream flowing in a concentration compartment of an electrodialysis device. The method of desalinating water can further comprise electrolytically generating one of chlorine and a hypochlorite species in an electrode compartment, typically the anode compartment, of at least one of an electrolytic device, an electrodialysis device and the electrically-driven separation device, and electrolytically generating a caustic stream in one or more compartments of at least one of the electrolytic device, the electrodialysis device, and the electrically-driven separation device. Further, the desalination method can also comprise at least partially disinfecting at least a portion of the seawater with the generated chlorine, the generated hypochlorite species, or both.

Some particular aspects, embodiments, and configurations of the systems and techniques of the invention can involve treating water in a system 100 as exemplarily illustrated in FIG. 1.

The treatment system 100 can be fluidly connected or connectable to a source of a liquid to be treated 110. Typically, the liquid to be treated has mobile ionic species. For example, the liquid to be treated can be or comprise water having salts as dissolved solids therein. In particular applications of the invention, the liquid to be treated can be seawater, comprise seawater, or consist essentially of seawater. In other cases, the liquid to be treated can be brackish water, comprise brackish water, or consist essentially of brackish water.

The treatment system 100 can comprise a first treatment stage 120 fluidly connected to the source of liquid to be treated 110. The treatment system 100 can further comprise a second stage 130, and where advantageous, a third treatment stage 140 to produce treated product to a point of use 190.

The first treatment stage modifies at least one property or characteristic of the liquid to be treated. Preferably, the first treatment stage 120 reduces at least a portion of one or more target species in the liquid to be treated to provide an at least partially treated liquid. For example, the first treatment stage 120 can utilize one or more unit operations that remove at least a portion of dissolved species in seawater from source 110 to produce at least a partially treated water or water stream 121 having a salinity content less than seawater. Preferred configurations can provide at least partially treated water stream 121 that has at least 5% less salinity that seawater from source 110. Other preferred configurations can provide the at least partially treated water that has at least 10% less salinity that seawater. The first treatment stage 120 can utilize or be designed to provide a target change or difference in relative concentration or salinity between the liquid to be treated, e.g., seawater, and the at least partially treated liquid stream, e.g., at least partially treated water. The target difference in concentration provided by the first treatment stage 120 can be at least partially dependent on several factors or conditions including, but not limited to, any one or more of the capacity of one or more downstream unit operations, one or more requirements of one or more of the downstream unit operations, and, in some case, the overall water demand of the treatment system 100. For example, the change in concentration, e.g., change in salinity, provided by the first treatment stage 120 can be dependent on desalinating seawater to provide at least partially treated water that is conducive to treatment by an electrodeionization device, a nanofiltration device or both. Other factors that may affect the design approach of the first treatment stage 120 can be dictated, at least partially, by economic or operating considerations. For example, the first treatment stage 120 can be configured to provide at least partially treated water utilizing available electrical power at an existing facility.

Further configurations or alternatives of the first treatment stage 120 can involve one or more unit operations that selectively remove one or more target or predetermined species from the liquid to be treated. For example, the first treatment stage can comprise or utilize one or more unit operations that at least partially selectively remove from or reduce the concentration of dissolved monovalent species in the liquid to be treated. In other cases, the first treatment stage can comprise or utilize one or more unit operations that provide a product stream having a concentration of one or more types of dissolved species therein that is greater than the concentration of the dissolved species in the liquid to be treated. In still other cases, the first treatment stage can provide a second product stream 123 having a concentration of dissolved solids therein that is greater than ancillary liquid stream, which can be a stream from a unit operation that is unassociated with a unit operation of treatment system 100. For example, the ancillary stream can be a downstream byproduct of one or more sources (not shown). In other cases, the change in concentration or salinity provided by the first treatment stage 120 in the at least partially treated stream 102 can be dependent on providing a second product stream 123 that would be utilizable in one or more downstream unit operations of treatment system 100. In still other cases, the first treatment stage 120 can provide a second product stream 123 having a salinity that is greater than the salinity of seawater, which has a typically salinity of about 3.5%. Preferably, the salinity of second product stream 123 is at least about 5% but some particular embodiments of the invention can involve a product stream 123 having a salinity of at least about 9%. For example, the second product stream 123 can be a brine stream with a dissolved solids concentration of at least about 10%, or at least about 99,000 ppm. In other exemplary embodiments, a ratio of the dissolved solids concentration in second product stream 123 to one or more other process streams of treatment system 100 can be at least about 3, preferably, at least about 5, and, in some advantageous cases which, for example, may require a concentration difference or gradient, at least about 10.

The second stage 130 can have at least one unit operation that further treats the at least partially treated product stream 121. In some embodiments of the invention, the second stage 130 can comprise one or more unit operation that adjusts one or more characteristics of the at least partially treated stream 121 from the first stage 120 to provide a second at least partially treated product stream or modified liquid 131. Preferably, the second stage 130 modifies at least two characteristics of the stream 121 to produce stream 131.

The third treatment stage 140 can modify one or more properties or characteristics of one or more inlet streams thereinto. In particularly advantageous configurations in accordance with one or more aspects of the invention, the third treatment stage 140 can comprise one or more unit operations that utilize at least one stream from at least one upstream unit operation to modify another stream from one or more upstream unit operations to provide a product stream to the point of use 190 with at least one desirable property or characteristic. Further particular configurations of the third treatment stage 140 can involve one or more unit operations that create a potential difference that facilitates treatment of the at least partially treated stream 131 to produce a product stream 141. In still further preferred configurations the third treatment stage can produce another product stream 142 that can be utilize in one or more upstream unit operations of treatment system 100. For example, the another product stream 142 can be a byproduct or second product stream utilized by one or more unit operations of second stage 130 in, for example, a step or an operation thereof, as an inlet stream that at least partially facilitates conversion of the at least partially treated stream 121 to provide the product stream 131 with at least one desirable property or characteristic. Further preferred embodiments or configurations of third treatment stage 140 can involve unit operations that rely on a difference of a property or characteristic of the liquid to be treated relative to the property or characteristic the product stream from the unassociated unit operation or an upstream stage or unit operation of treatment system 100 to at least partially facilitate treatment to provide the product stream 141. For example, the third treatment stage 140 can utilize the difference in salinity of seawater from the source 110, as stream 111, relative to the salinity of stream 122 to at least partially facilitate reducing a concentration of one or more target species in stream 131 to produce a product water 141 having at least one desired characteristic, e.g., purity.

Figure 2:
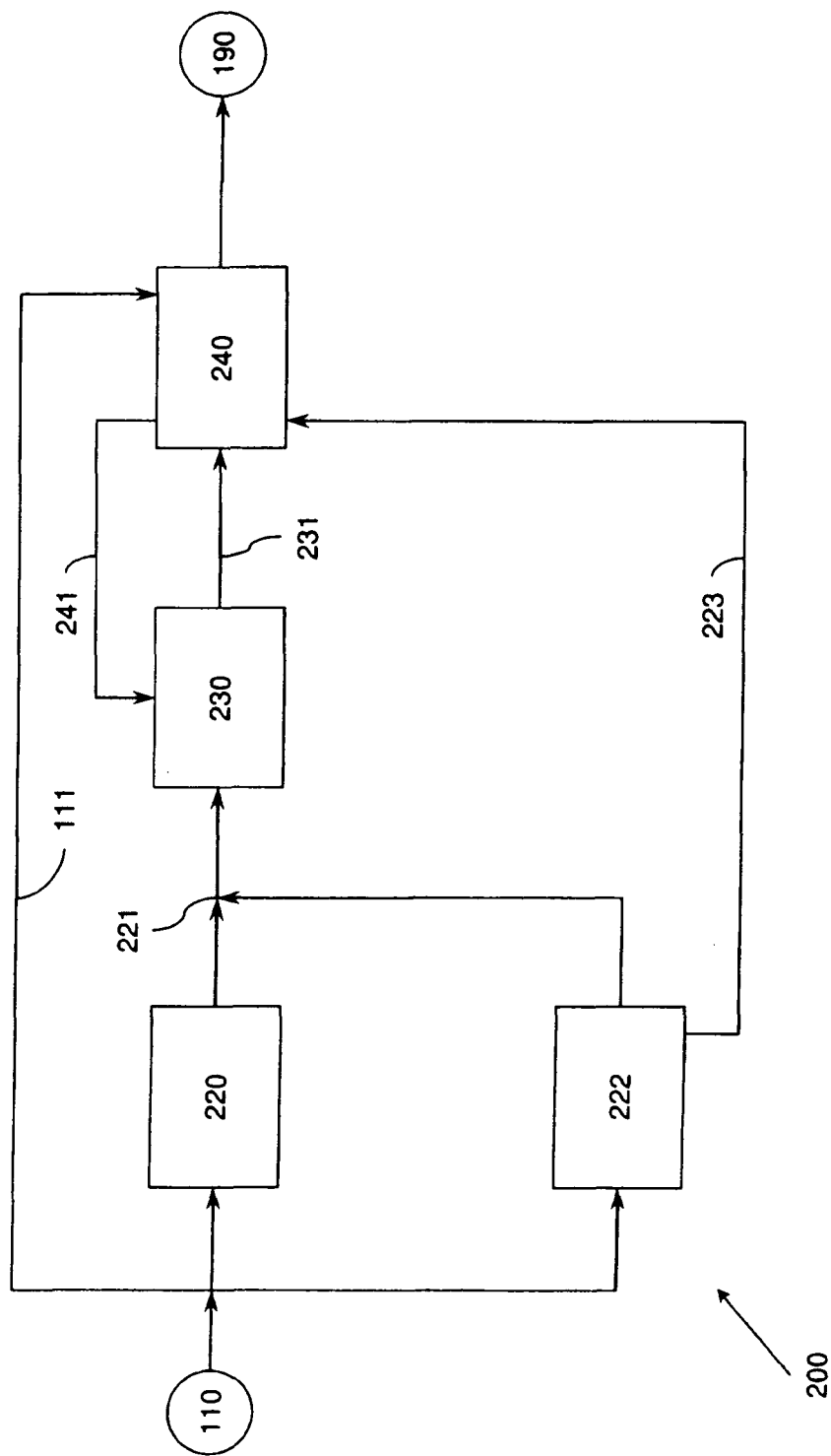
FIG. 2 is a schematic flow diagram of a system in accordance with one or more further embodiments of the invention.

FIG. 2 illustrates an exemplary water treatment system 200 in accordance with one or more aspects of the invention. The treatment system 200 can comprise a first treatment stage including a first unit operation 220 and a second unit operation 222, each preferably, but not necessarily fluidly connected to the source 110 of water to be treated through respective inlets thereof. The treatment system 200 further comprises a second stage 230 fluidly connected to receive, typically at an inlet thereof, one or each product stream from the first unit operation 220 and the second unit operation 222, typically from respective outlets thereof. The treatment system 200 can further comprise a third treatment stage 240 having an inlet fluidly connected to at least one of an outlet of the second stage 230, an outlet of one or more unit operations of the first treatment stage, the source of water to be treated, and the unassociated unit operation, to provide a product water to, for example, the point of use or a storage 190.

As illustrated in the exemplary embodiment of FIG. 2, the first unit operation 220 can provide a first partially treated water stream and be combined with another at least partially treated water stream from unit operation 222 to produce an at partially treated product stream 221. The first water stream from an outlet of unit 220 can have one or more characteristics that differ from those of the second water stream from unit 222. The first and second unit operations are preferably designed to provide the at least partially treated water stream 221 having at least one target property for further modification or treatment in second stage 230. The second unit operation 222 can provide a second product stream 223, which preferably has one or more particular or target characteristics. Thus, some configurations of the invention contemplate unit operations 220 and 222 that collectively provide an at least partially treated water stream 221 with one or more particular characteristics while further providing a second product aqueous stream 223 with one or more characteristics that typically differ from the characteristics of stream 221. The first treatment stage can utilize water treating unit operations, devices, or systems such as, but not limited to electrodialysis devices and electrodeionization devices.

Further particular embodiments of the invention can involve a first unit operation that is operated to have lower power consumption relative to the second unit operation. The first unit operation 220 can be operated to produce from seawater, an at least partially treated water product or stream having a total dissolved solids of about 2,500 ppm, with about 30% water recovery. The second unit operation 222 can be operated to produce from seawater, an about 10% brine solution having a dissolved solids concentration of greater than about 99,000 ppm.

In another embodiment (not shown), the second stage 130 can comprise two or more unit operations that separately receive streams from the first and second unit operations 220 and 222. One or more preferred configurations of the second stage 230 can involve one or more unit operations that alter at least one property of inlet stream 221 from at least one unit operation of the first treatment stage. The second stage can thus provide a third product stream 231, with one or more target characteristics, and which can be further treated in the third treatment stage 240.

Other embodiments of the invention can involve ion exchanging units comprising chloride-form anion exchanging resin that exchange at least a portion of sulfate species in favor of chloride species to further reduce power requirements of one or more downstream unit operations, and, in some cases, to further reduce the likelihood of scale formation in such downstream unit operations. Thus, the exchanging unit can involve cation exchanging resin that at least partially reduces the concentration of non-monovalent cationic species, such as $Ca^{2+}$ and $Mg^{2+}$, in favor of monovalent cation species, such as $Na^+$, and, preferably, further comprises anion exchanging resin that at least partially reduces the concentration of non-monovalent anionic species, such as $SO_4^{2-}$, in favor of monovalent anionic species, such as $Cl^-$, which can reduce the treatment power requirement of one or more downstream unit operations. Regeneration of any of the ion exchanging resin types can be performed with, for example, a waste brine stream having dissolve $Na^+$ and $Cl^-$.

The third treatment stage 240 can comprise one or more unit operations that utilize the second product water or aqueous stream 223 and another stream, such as a water stream 111 from source 110 to facilitate treatment of the third water product stream 231 and provide treated, product water to the point of use or storage 190. Further preferred configurations of the third treatment stage 240 can involve producing a byproduct water or aqueous stream 241, which can be used in one or more upstream or downstream stages of the treatment system 200. For example, the byproduct water stream can be used in one or more unit operations in the second stage 230 as an input or reactant during operation thereof. The third treatment stage can utilize one or more unit operations, devices, or systems such as, but not limited to electrodialysis and electrodeionization devices.

Figure 3:
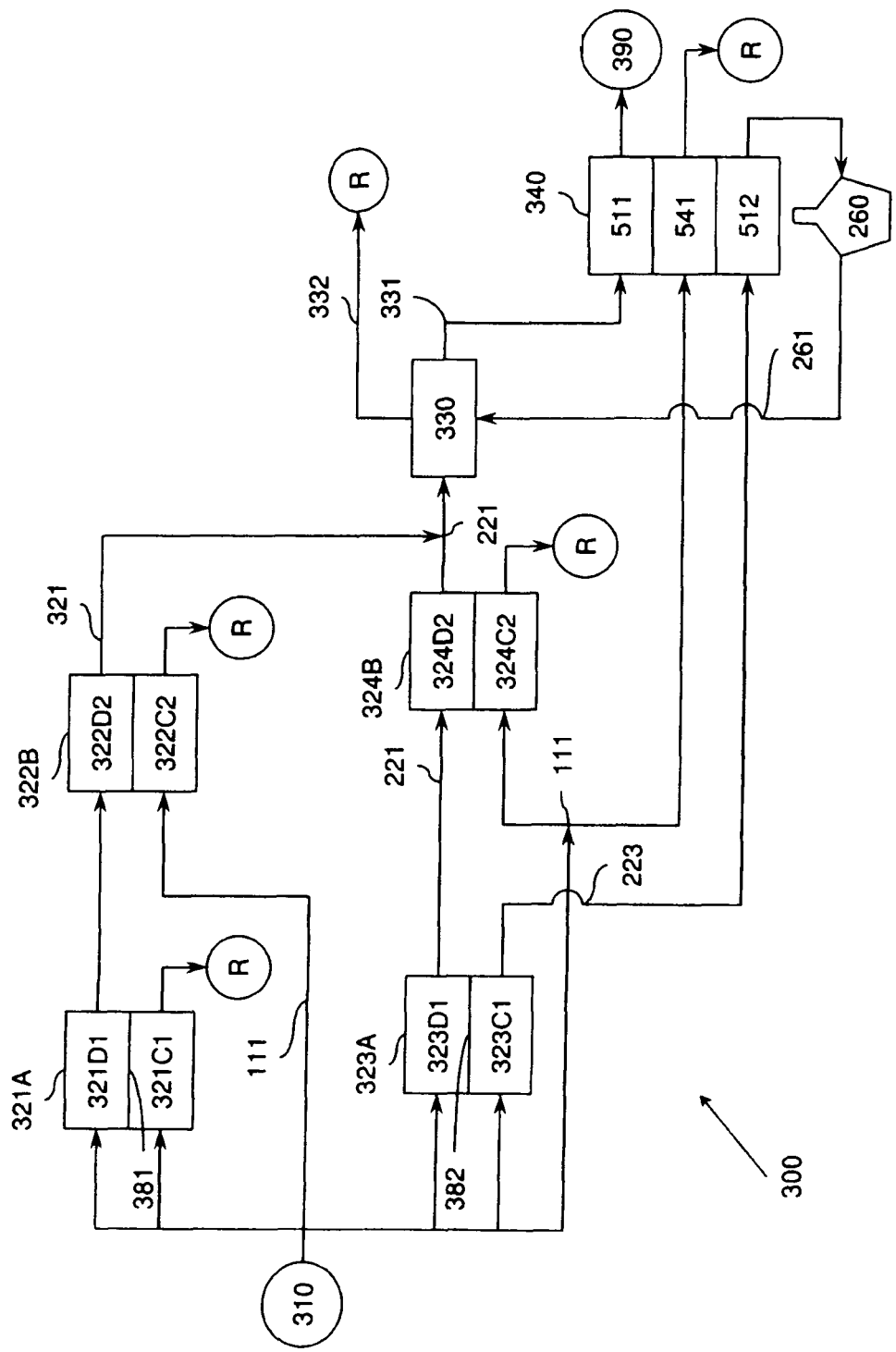
FIG. 3 is a schematic flow diagram of a seawater desalination system in accordance with one or more embodiments of the invention.

FIG. 3 illustrates a seawater desalination system 300 in accordance with one or more aspects of the invention. Desalination system 300 typically comprises a first train having at least one first electrodialysis device 321A and, preferably, at least one second electrodialysis device 322B. Desalination system 300 can further comprise a second train having at least one third electrodialysis device 323A and, preferably, a second electrodialysis device 324B. Desalination system 300 can also comprise at least one ion exchanging subsystem 330 with at least one ion exchanger inlet in fluid communication with an outlet of at least one of the upstream electrodialysis devices 321A, 322B, 323A, and 324B. Desalination system 300 can also comprise a third treatment stage 340 that can further treat the at least partially treated water 331 from at least one ion exchanger outlet of ion exchanging subsystem 330.

The first electrodialysis device 321A has at least one depletion compartment 321D1 having an inlet fluidly connected to a source 310 of seawater. The first electrodialysis device 321A also comprises at least one concentration compartment 321C1, preferably fluidly connected to the source 310 of seawater. The second electrodialysis device 322B of the first train typically comprises at least one depletion compartment 322D2 and at least one concentration compartment 322C2. An outlet of the first depletion compartment 321D1 is fluidly connected to at least one of an inlet of the at least one depletion compartment 322D2 and an inlet of the at least one concentration compartment 322C2 of the second electrodialysis device 322B. In some particular embodiments, the inlet of the at least one concentration compartment 322C2 of the second electrodialysis device 322B is fluidly connected to the source 310 of seawater. Preferred embodiments in accordance with some aspects of the invention involve a first train of devices that at least partially treats seawater to produce an at least partially treated water 321 having at least one target characteristic. For example, the first train of electrodialysis devices that partially desalinate water, preferably, selectively removes dissolved solids species from the seawater, to produce an at least partially treated product water stream 321 having any one or more of a dissolved solids concentration that is less than seawater, relatively higher ratio of dissolved non-monovalent dissolved solids species to dissolved monovalent species than the corresponding ratio of seawater, and a lower concentration of dissolved monovalent species concentration. In embodiments that seek to selectively remove dissolved monovalent species, one or more monovalent selective membranes can be used to define, at least partially the depletion compartments, and, preferably, at least partially define a concentration compartment. For example, the electrodialysis device 321A can have a first depletion compartment 321D1 at least partially defined by a monovalent anionic selective membrane 381 and a monovalent cationic selective membrane (not shown), and a first concentration compartment 321C1 in ionic communication with the first depletion compartment through the monovalent anionic selective membrane 381, and, optionally, a second concentration compartment (not shown) through the monovalent cationic selective membrane. The second electrodialysis device 322B can also be optionally configured to have one or more monovalent selective membranes that facilitate selective removal or depletion one or more monovalent species from the water stream introduced into the depletion compartments thereof and accumulated into the concentration compartments thereof.

During operation of the first and second electrodialysis devices, seawater can be used as a concentration stream, feeding into the concentration compartments 321C1 and 322C2, which collects the one or more removed species from the streams introduced into the depletion compartments. The concentration streams leaving compartments 321C1 and 322C2 and containing species removed from the depletion compartments can be discharged as a waste or reject stream or be utilized in other unassociated processes R.

The at least one third electrodialysis device 323A can be configured to provide a product stream that is useable in a downstream unit operation of desalination system 300. In accordance with a particular embodiment, the third electrodialysis device 323A can have at least one depletion compartment 323D1 and at least one concentration compartment 323C1 in ionic communication with at least one of the depletion compartments 323D1 through a ion selective membrane 382. Preferably, an electric current applied through the third electrodialysis device 323A provide sufficient potential to provide a product water stream from the concentration compartment 323C1 having one or more predetermined or target characteristics. For example, electrodialysis device 323A can also be constructed with a monovalent selective membrane that separates but provides ionic communication between the depletion compartment 323D1 and the concentration compartment 323C1. The at least one fourth electrodialysis device 324B can comprise at least one depletion compartments 324D2, defined at least partially by anionic and cationic selective membranes, and at least one concentration compartment 324C2, typically in ionic communication with at least one of a depletion compartment 324D2. During operation of system 300, product water from the depletion compartment 323D1 can be introduced into the depletion compartment 324B to further treat seawater from source 310 and facilitate production of at least partially treated water 221. As exemplarily illustrated, the product water from the depletion compartment 324D2 can be combined with product water 321 from the depletion compartment 322D2 to produce the at least partially treated water 221 for further treatment.

The first train including the first and second electrodialysis devices 321A and 322B can be operated to produce water having a target total dissolved solids concentration, such as about 2,500 ppm, with an overall water recovery rate of about 30%. The first and second electrodialysis devices 321A and 322B can utilize at least one of monovalent anion selective membrane and cation selective membrane and, preferably, at least the first electrodialysis device 321A utilizes monovalent anion selective membranes and monovalent selective cation selective membrane, which should at least reduce any scaling potential therein.

The second train including the third and fourth electrodialysis devices 323A and 324A can be operated to produce a brine stream having a target salinity content of at least about 10% (NaCl) in a concentrate stream from one or more concentration compartments thereof. Preferably, the third electrodialysis device produces a sufficient amount of brine at least the target salinity level while operating at a water recovery of about 70%. The fourth electrodialysis device 324B can be operated to produce the at least partially treated water having a target dissolved solids content of about 2,500 ppm, and preferably with a recovery rate of about 48%. In some particular configurations of the invention, the overall recovery rate of the second train can be about 40%.

The ion exchanging subsystem 330 can be configured to receive at least a portion of the at least partially treated water 221 and convert or modify at least one characteristic thereof. Some embodiments of one or more aspects of the invention involve selectively reducing a concentration of a target dissolved species of a water to be treated while at least partially retaining or inhibiting transport of at least a portion of non-target or other dissolved species, and then substituting at least a portion of the retained dissolved species with the target dissolved species. For example, water 221 can have a relative high concentration of non-monovalent dissolved species, such as calcium and magnesium, compared to seawater, and be treated to exchange at least a portion of the non-monovalent species for monovalent species, such as sodium. Some configurations of the exchanging subsystem 330 can involve at least two exchange trains (not shown) of softeners or beds of ion exchange media. The first ion exchange train can comprise a leading ion exchange bed followed by a lagging ion exchange bed, which can preferably substitute at least a portion of the non-monovalent dissolved species in the water, such as $Ca^{2+}$ and $Mg^{2+}$, in favor of monovalent dissolved species such as $Na^+$. The second ion exchange train can similarly comprise serial leading and lagging ion exchange beds. During operation, the one of the first and second ion exchange trains can have an inlet fluidly connected to receive at least a portion of at least partially treated water 221 and produce an exchange water stream having less non-monovalent dissolved species concentration. Once the first ion exchange train becomes saturated with non-monovalent species as a result of the non-monovalent for monovalent ion exchanging process, the second ion exchange train can be utilized. The first train can then be regenerated by introducing an aqueous stream rich in monovalent dissolved species to replace at least a portion of non-monovalent species bound to the ion exchange media of the ion exchange beds. The ion exchange units can comprise a mixed bed of ion exchange resin such as those commercially available as AMBERLITET™ and AMBERJET™ resin from Rohm and Haas, Philadelphia, Pa.

Regeneration of the ion exchange media can be performed by utilizing a brine solution 261 with sufficient salinity, such as about 10%, from a brine storage tank 260. A discharge stream 332 from ion exchanging subsystem 330 can be discharged as a reject stream. Salinity sufficient to regenerate the ion exchange media can be at a level that surpasses the thermodynamic resistance associated with binding the non-monovalent species to the exchange matrix.

Figure 4:
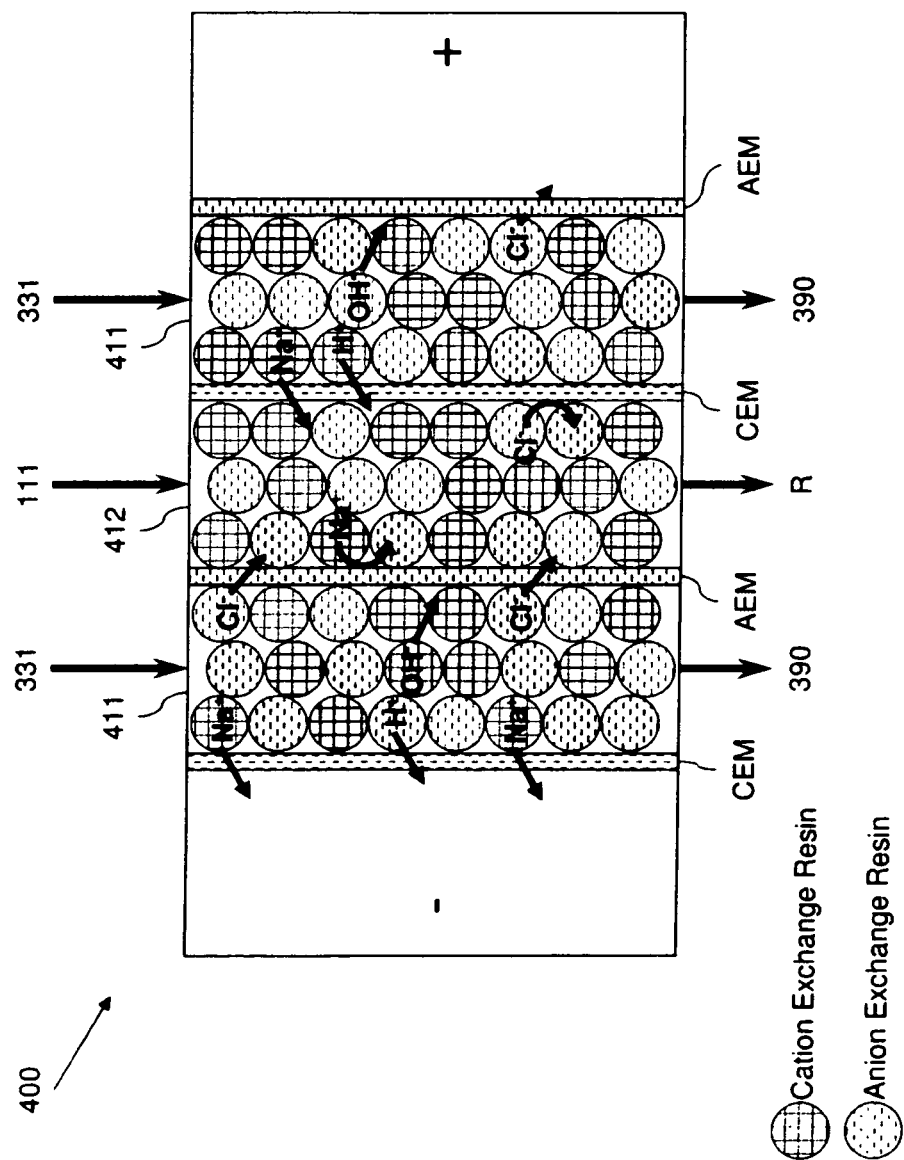
FIG. 4 is a schematic representation of a portion of an electrodeionization device which can be utilized in one or more systems in accordance with one or more aspects of the invention.
Figure 5:
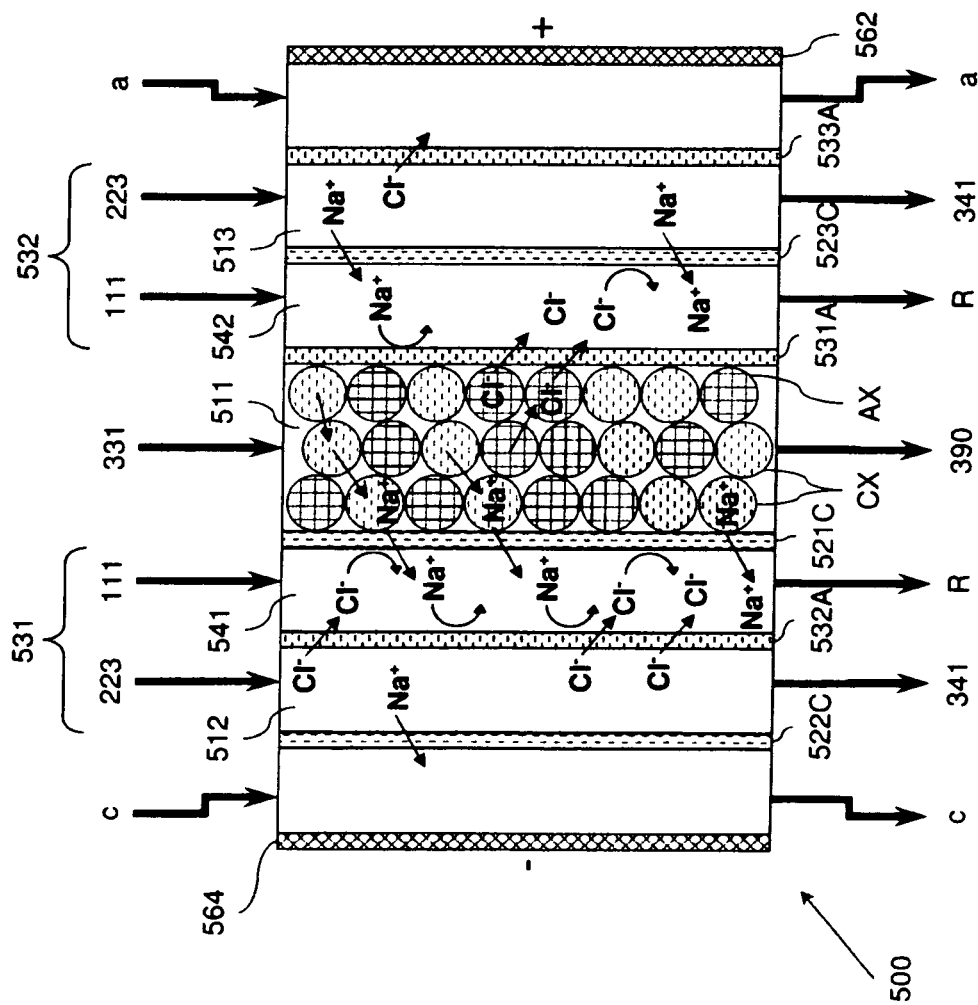
FIG. 5 is a schematic representation of a portion of an electrodeionization device in accordance with one or more aspects of the invention.

The third treatment stage 340 can comprise one or more electrodeionization device. In some embodiments of the invention, the third treatment stage can comprise at least one of a conventional electrodeionization device as illustrated in FIG. 4 and a modified electrodeionization device as illustrated in FIG. 5. In still other configurations in accordance with one or more aspects of the invention, the third treatment stage can comprise one or more electrodeless continuous deionization devices.

The electrodeionization device illustrated in FIG. 4 typically comprises at least one depleting compartment 411 and at least one concentrating compartment 412, disposed adjacent at least one of the depleting compartment 411. Each of the depleting and concentrating compartments are at least partially defined by any of an anion selective membrane AEM and a cation selective membrane CEM. In contrast to electrodialysis devices, the compartments of electrodeionization device contain cation exchange resin and anion exchange resin. During operation with an imposed electrical current, cationic species, such as $Na^+$, typically migrate to a cathode (−) of the device and anionic species, such as $Cl^-$, typically migrate toward an anode (+) of the device 400. The anion selective membrane AEM and the cation selective membranes CEM trap the migrating or transporting dissolved species, $Na^+$ and $Cl^-$, in respective concentrating compartments 412 as reject streams R. The feed into one or more of the depleting compartments is typically the softened water stream 331 from the ion exchanging subsystem 330. The product water from the depleting compartments can then be stored or delivered to a point use. One or more power supplies (not shown) typically provides electrical energy or power to the electrodeionization device 400 that facilitates separation of the target dissolved species. In some cases, a portion of the electrical energy is utilized to dissociate water to $H^+$ and $OH^-$ species. The power supply can be controlled to provide a desired or target current level, desired or target voltage or potential level, and current polarity.

FIG. 5 exemplarily illustrates a modified electrodeionization device 500 that can be utilized in the third treatment stage of the treatment system. The device 500 comprises at least one first depleting compartment 511, which is typically at least partially defined by a first cation selective membrane 521C and a first anion selective membrane 531A at least one first concentrating compartment 521, and at least one first concentrating compartment 541, which can be at least partially defined by a second anion selective membrane 532A, and in ionic communication the first depleting compartment 511 through at least a portion of the first cation selective membrane 521C. The device 500 can further comprise a second depleting compartment 512, which is defined at least partially by a second cation selective membrane 522C, and in ionic communication with the first concentrating compartment 541 through at least a portion of the second anion selective membrane 532A. The electrodeionization device 500 can further comprise a second concentrating compartment 542 defined at least partially by a third cation selective membrane 523C. The second concentrating compartment 542 is preferably at least partially in ionic communication with the first depleting compartment 511 through the first anion selective membrane 531A. The electrodeionization device 500 can further comprise a third depleting compartment 513 preferably defined by a third anion selective membrane 533A. The third depleting compartment 513 is preferably at least partially in ionic communication with the second concentrating compartment 542 through the third cation selective membrane 523C. The electrodeionization device 500 typically has an anode compartment 562 housing an anode, and a cathode compartment 564 housing a cathode.

In accordance with other aspects of the invention, the electrodeionization device 500 comprises a first depleting compartment 511 containing cation exchange media and anion exchange media such as cation exchange resin CX and anion exchange resin AX, and at least partially defined by the first cation selective membrane 521C and the first anion selective membrane. In some cases, only the first depleting compartment or only the compartments receiving or fluidly connected downstream from any of the depletion compartments of the electrodialysis devices and the ion exchange unit comprises electroactive media such as ion exchange resin, and the other compartments are free of ion exchange media. For example, in some configurations of the electrodeionization device 500, each of the one or more first depleting compartments comprises 511 a mixed bed of ion exchange resin, and each of the one or more first concentrating compartments 541, the one or more second depleting compartments 512, the one or more second concentrating compartments 542, and the one or more third depleting compartments 513 do not contain ion exchange media.

In operation, power from a power supply (not shown) provides electrical energy for an electric field, which is typically created across the electrodeionization device 500 through the anode and the cathode. Water to be treated from, for example, an outlet of second stage ion exchanging unit 330 enters the depleting compartment 511 through an inlet thereof. The water to be treated has dissolved species that can migrate under the influence of the electric field in the electrodeionization device 500. Typically, the aqueous stream 331 contains a higher amount of target dissolved monovalent species, Na+ and Cl−, relative to dissolved non-monovalent species because of the ion exchanging process in unit operation 330. Thus, because the amount of energy associated with promoting transport of monovalent species can be relatively less than the associated amount of energy in promoting transport of non-monovalent species, additional capital and operating costs for second stage 330 can be reduced, if not eliminated. The monovalent species typically migrate to the corresponding attracting electrodes and further through the anion or cation selective membranes into one of the first concentrating compartment and the second concentrating compartment. For example, cationic Na$^+$ species can be drawn to the direction of the cathode and typically pass through the cation selective membrane 521C whereas the anionic Cl$^-$ species can be drawn toward the anode and typically pass through the anion selective membrane 531A. The product stream from the outlet of the depleting compartment 331 will typically have a reduced concentration of the target dissolved solids species.

In some configurations of the invention, a stream having a first concentration of dissolved solids therein can be used a concentrating stream to collect the migrating target dissolved solids species. For example, a seawater stream 111 having a salinity of about 3.5% can be used as the concentrating stream introduced into the first concentrating compartment 541. The stream leaving the first concentrating compartment 541 will thus be typically rich in the migrating cation or anion species. This stream can be discharged as waste or reject stream R. Also during operation, another feed stream is typically introduced into the second depleting compartment 512 and the third depleting compartment 513.

The electrodeionization device 500 can further comprise a first concentration cell pair 531 and, optionally, a second concentration cell pair 532, each of which is preferably in ionic communication with the first depleting compartment 511. The first concentration cell pair 531 can comprise a first half-cell compartment 541 fluidly connected to a source of a first aqueous liquid having a first dissolved solids concentration, and in ionic communication with the depleting compartment 511 through the first cationic selective membrane 521C, and a second half-cell compartment 512. The second half-cell compartment is typically in ionic communication with the first half-cell compartment 541 through the anion selective membrane 532A. The optional second concentration cell pair 532 can comprise a third half-cell compartment 542 and a fourth half-cell compartment 513. The third half-cell compartment is typically in ionic communication with the depleting compartment 511 through the anion selective membrane 531A. The fourth half-cell 513 compartment is typically in ionic communication with the third half-cell compartment 542 through the cation selective membrane 523C.

Further advantageous features of the invention can involve establishing a concentration difference between adjacent cell by providing compositionally similar respective feed streams but with differing concentrations of dissolved constituents. The concentration difference generates a potential, e.g., an electromotive potential E (in V), that can be at least partially quantified by the Nernst equation, $$E = \frac{RT\ln\left[\frac{(conc1)}{(conc2)}\right]}{nF}$$

where conc1 is the concentration of dissolved solids in the stream 223 introduced into the second half cell 512, conc2 is the concentration of dissolved solids in the stream 111 introduced into the first half-cell 541, R is the gas constant, 8.314 J/(K·mole), T is the temperature, typically 298 K, n is the number of electrons transferred in the cell reaction, n=1 for seawater and brine, and F is the Faraday constant, 96,498 coulombs/mole. Thus, some preferred configurations in accordance with some aspects of the invention can involve utilizing a brine stream 223 having a dissolved solids concentration greater than the dissolved concentration of seawater stream 111 introduced into the first depleting compartment. The brine stream, typically having a salinity of at least about 8%, preferably at least about 10%, and more preferably, at least about 12%, or a dissolved solids concentration of at least about 80,000 ppm, preferably, at least about 99,400 ppm, and more preferably, at least about 120,000 ppm can be used a feed stream 223 introduced into the second half-cell compartment 512, and preferably also into the fourth half-cell compartment 513. Each of the streams 341 leaving the second and fourth half-cell compartments 512 and 513 may still have a high brine content, relative to seawater, and can be directed to storage in a brine storage tank 260. The feed stream 111 introduced into the first half-cell compartment 541, and optionally also the third half-cell compartment 542, can be seawater or an aqueous stream having a salinity of about 3.5% or a dissolved solids concentration of less than about 36,000 ppm. The above-noted exemplary conditions can provide about 0.026 volts per concentration cell pair. Thus, the present invention can advantageously generate electrical potential that facilitates treatment or desalination of seawater. Example 1 below provides expected generated potentials based on exemplary conditions when utilizing a first stream and a second stream in a concentration cell pair, wherein the second stream has a concentration of dissolved solids greater the concentration of dissolved solids of the first stream.

In some cases, one or more devices of the third treatment stage comprises sufficient number of concentration cell pairs to provide substantially all the electrical potential required to desalinate the product stream 331 to a desired level. In such configuration, the device can comprise a salt bridge (not shown), typically having an electrolyte therein, such as potassium chloride or sodium chloride, that ionically connects the half-cell compartments of the device. For example, a first end of a salt bridge can ionically connect the second half-cell compartment 512 with any of depleting compartment 511 and the fourth half-cell compartment 513.

Figure 6A:
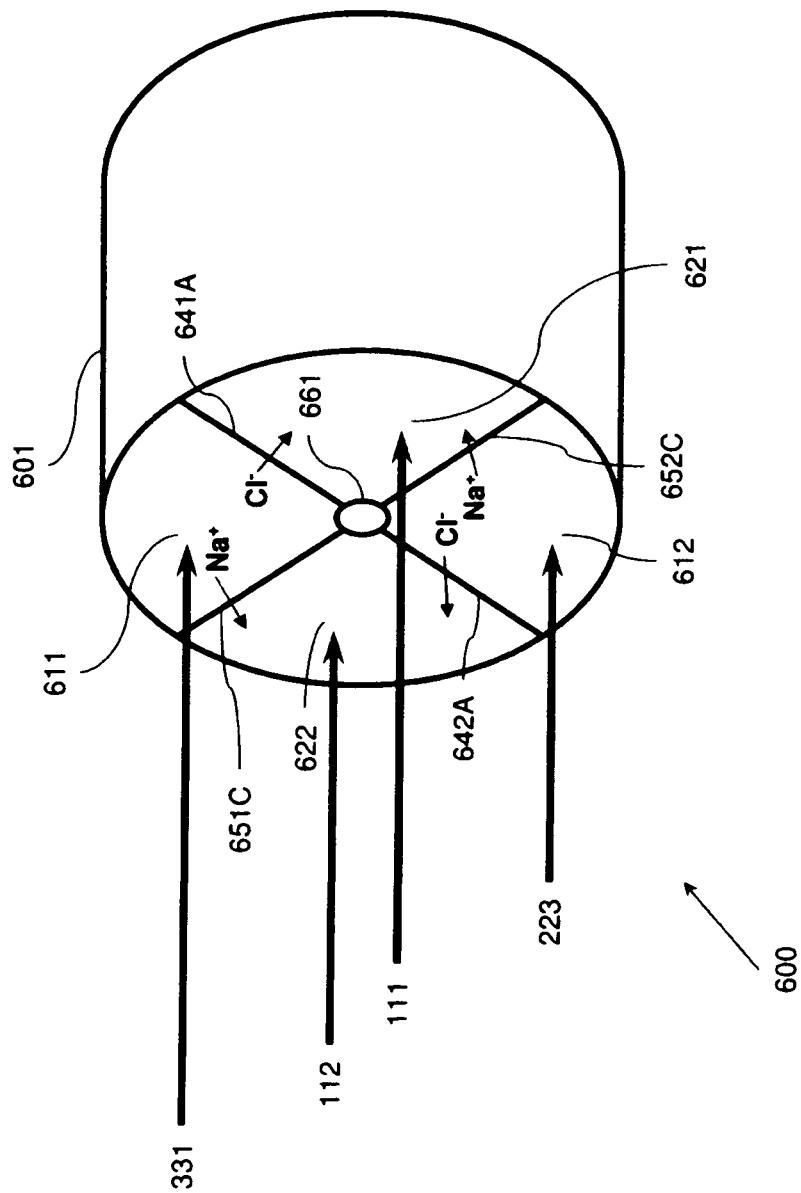
FIGS. 6A and 6B are schematic representations of portions of electrodeless continuous deionization devices in accordance with one or more aspects of the invention.
Figure 6B:
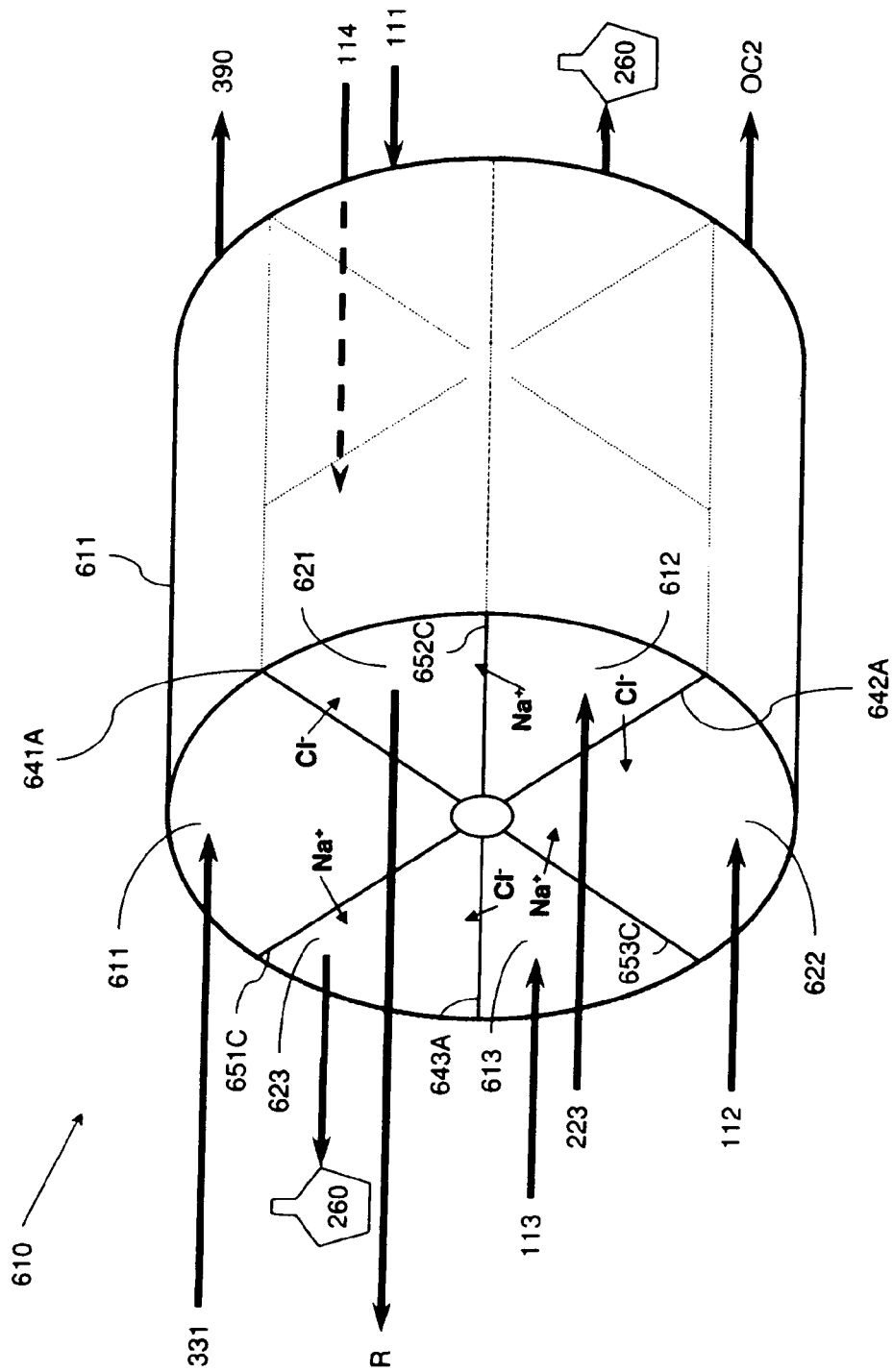

FIGS. 6A and 6B illustrate electrodeless continuous deionization devices 600 and 610 that may be characterized, in accordance with still some aspects of the invention, as being Donnan potential assisted or a Donnan-enhanced EDI device. The device 600 can comprise a circular cylindrical shell 601 housing at least one first depleting compartment 611, each having liquid to be treated 331 introduced thereinto. The device can further comprise at least one first concentrating compartment 621, each having a first feed stream 111 introduced thereinto, and at least one second depleting compartment 612, each having a second feed stream 223 introduced thereinto. The device 600 typically further comprises at least one second concentrating compartment 622, each having a third feed stream 112 introduced thereinto. The first depleting compartment 611 can be defined by an anion selective membrane 641A and a cation selective membrane 651C. The first concentrating compartment 621 can be defined by an anion selective membrane, such as membrane 641A, and a second cation selective membrane 652C. As exemplarily illustrated, the first depleting compartment is in ionic communication with the first depleting compartment through membrane 641A. The second depleting compartment 612 can be defined by a cation selective membrane and second anion selective membrane 642A. Preferably, the second depleting compartment 612 is in ionic communication with the first concentrating compartment 621 through cation selective membrane 652C. The second concentrating compartment 622 can be defined by an anion selective membrane and a cation selective membrane. Preferably, the second concentrating compartment is in ionic communication with the second depleting compartment 612 through the second anion selective membrane 642A. Further preferred configurations can involve having the second concentrating compartment in ionic communication with the first depleting compartment 611 through one of a salt bridge and the first cation selective membrane 651C. Member 661 can provide ionic and electrical insulation as well as structural support for the compartments.

The second feed stream 223 typically has a concentration of dissolved solids therein that is greater than the concentration of dissolved solids in the first feed stream 111, and preferably, also greater than the concentration of dissolved solids in the third feed stream 112. The concentrations of dissolved solids of each of the first feed stream and the third feed stream can be the same or less than the concentration of dissolved solids in the liquid to be treated 331. As described above, the concentration differences between the paired half-cells 612 and 621, and 612 and 622, can create a potential that facilitates transport of $Na^+$ and $Cl^-$ species from the depleting compartment 611, as illustrated, to produce the product stream.

Similar to the electrodeless device 600, the device 610 illustrated in FIG. 6B comprises a second cell pair including a depleting compartment 613 and concentrating compartment 623, respectively having feed streams 113 and 114. Feed stream 113 can be brine from, for example, electrodialysis device 323A, and feed stream 114 can be seawater from the source 310. A plurality of pairs of depleting and concentrating compartments utilizing seawater and brine streams to advantageously generate a potential sufficient to drive the treatment of at least partially treated water, having a dissolved solids concentration of, for example, about 2,500 ppm, to produce product water having a target dissolved solids concentration of, for example, about 500 ppm.

Other configurations can involve any one or more of the feed streams 111 and 114 at least partially comprising at least partially treated water 331, which can provide a greater concentration difference relative to brine stream 223.

Further notable differences include countercurrent flow directions of some of the streams through the compartments. As illustrated, the second stream 111 can be counter-currently introduced into the first concentrating compartment 621, relative to the direction of the stream introduced into the first depleting compartment 611 or, in some cases, relative to the third stream 223 introduced into the second depleting compartment. Concentration differences between the second and third streams can create a potential driven by the half-cell reactions associated with migration of dissolved species, such as $Na^+$ and $Cl^-$.

Any of the membranes in devices 600 and 610 can be monovalent anion selective or monovalent cation selective.

In some configurations of the invention, an electrolytic device (not shown) can be used to generate an aqueous solution comprising a disinfecting species such as chlorine, chlorite, hypochlorite, and hypobromite. In other configurations, at least one of the electrodeionization device and any one or more of the electrodialysis devices can be utilized to generate any one or more of an acidic solution, a basic solution, and a disinfecting solution. For example, a relatively pure water stream can be introduced into the anode compartment (+) to collect and aggregate $H^+$ species to produce an acidic outlet stream having a pH of less than 7. A chloride containing solution can be introduced in a feed stream into the cathode compartment to facilitate generation of a disinfecting species such as chlorine and a hypochlorite species. Gaseous hydrogen byproduct may be vented or otherwise discharged.

Any of the various subsystems, stages, trains, and unit operations of the invention can utilize one or more controllers to facilitate, monitor, and/or regulate operation thereof. Preferably, a controller (not shown) monitors and, in some cases, controls each of the components of the systems of the invention.

The controller may be implemented using one or more computer systems. The computer system may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system may include specially programmed, special-purpose hardware, for example, an application-specific integrated circuit ASIC or controllers intended for analytical systems.

The computer system can include one or more processors typically connected to one or more memory devices, which can comprise, for example, any one or more of a disk drive memory, a flash memory device, a RAM memory device, or other device for storing data. The memory device is typically used for storing programs and data during operation of the treatment system and/or the computer system. For example, the memory device may be used for storing historical data relating to the parameters over a period of time, as well as operating data. Software, including programming code that implements embodiments of the invention, can be stored on a computer readable and/or writeable nonvolatile recording medium, and then typically copied into the memory device wherein it can then be executed by the processor. Such programming code may be written in any of a plurality of programming languages, for example, Java, Visual Basic, C, C#, or C++, Fortran, Pascal, Eiffel, Basic, COBAL, or any of a variety of combinations thereof.

Components of the computer system may be coupled by an interconnection mechanism, which may include one or more busses, e.g., between components that are integrated within a same device and/or a network e.g., between components that reside on separate discrete devices. The interconnection mechanism typically enables communications e.g., data, instructions to be exchanged between components thereof.

The computer system can also include one or more input devices, for example, a keyboard, mouse, trackball, microphone, touch screen, valves, position indicators, fluid sensors, temperature sensors, conductivity sensors, pH sensors, and composition analyzers, and one or more output devices, for example, a printing device, display screen, or speaker, actuators, power supplies, and valves. In addition, the computer system may contain one or more interfaces not shown that can connect the computer system to a communication network in addition or as an alternative to the network that may be formed by one or more of the components of the system.

According to one or more embodiments of the invention, the one or more input devices may include sensors for measuring one or more parameters of the treatment system. Alternatively, the sensors, the metering valves and/or pumps, or all of these components may be connected to a communication network that is operatively coupled to the computer system. For example, sensors may be configured as input devices that are directly connected to the computer system, and metering valves and/or pumps may be configured as output devices that are connected to the computer system, and any one or more of the above may be coupled to another computer system or component so as to communicate with the computer system over a communication network. Such a configuration permits one sensor to be located at a significant distance from another sensor or allow any sensor to be located at a significant distance from any subsystem and/or the controller, while still providing data therebetween.

The controller can include one or more computer storage media such as readable and/or writeable nonvolatile recording medium in which signals can be stored that define a program to be executed by the one or more processors. The medium may, for example, be a disk or flash memory. In typical operation, the one or more processors can cause data, such as code that implements one or more embodiments of the invention, to be read from the storage medium into a memory structure that allows for faster access to the information by the one or more processors than does the medium. The memory structure is typically a volatile, random access memory such as a dynamic random access memory DRAM or static memory SRAM or other suitable devices that facilitates information transfer to and from the processor.

Although the computer system is shown by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller PLC or in a distributed control system. Further, it should be appreciated that one or more features or aspects of the invention may be implemented in software, hardware or firmware, or any combination thereof. For example, one or more segments of an algorithm executable by the controller can be performed in separate computers, which in turn, can be communication through one or more networks.

EXAMPLES

The function and advantages of these and other embodiments of the invention can be further understood from the examples below, which illustrate the benefits and/or advantages of the one or more systems and techniques of the invention but do not exemplify the full scope of the invention.

Example 1

In this example, the expected potential that can be generated by utilizing concentration cell pairs in some configurations of the devices of the invention. Table 1 below provides calculated potentials based on concentrations of streams introduced into the half-cell compartments according to the Nernst equation at room temperature.

The table below shows that the ratio of concentrations of the feed streams is preferably as large a possible to increase the generated potentials. For example, the concentration ratios can be at least about 2, preferably at least about 3, more preferably at least about 5, and even more preferably at least about 10.

TABLE 1

| CONC1 | CONC2 | E (volts) | E (mV) |
| --- | --- | --- | --- |
| 1 | 1 | 0 | 0 |
| 10 | 1 | 0.059 | 59.1 |
| 100 | 1 | 0.118 | 118.2 |
| 1,000 | 1 | 0.177 | 177.4 |
| 10,000 | 1 | 0.024 | 236.5 |
| 2 | 1 | 0.018 | 18.8 |
| 3 | 1 | 0.028 | 28.2 |
| 4 | 1 | 0.036 | 35.6 |
| 5 | 1 | 0.041 | 41.3 |
| 6 | 1 | 0.046 | 46.0 |
| 7 | 1 | 0.050 | 50 |
| 8 | 1 | 0.053 | 53.4 |
| 9 | 1 | 0.056 | 56.4 |
| 5.68 | 1 | 0.044 | 44.6 |
| 2.3 | 1 | 0.021 | 21.4 |

The following listing provides the ionic concentrations of typical seawater. The predominant cationic species in seawater are $Na^+$, $K^+$, $Ca^{+2}$ and $Mg^{+2}$, and the predominant anionic species are $Cl^-$ and $SO_4^{2-}$. The respective concentrations of the bicarbonate and carbonate species will depend on pH of the water.

| Species | Concentration (ppm) |
| --- | --- |
| Chloride | 19,353 |
| Sodium | 10,781 |
| Sulfate | 2,712 |
| Magnesium | 1,284 |
| Potassium | 399 |
| Calcium | 412 |
| Carbonate/bicarbonate | 126 |
| Bromide | 67 |
| Strontium | 7.9 |
| Boron | 4.5 |
| Fluoride | 1.28 |
| Lithium | 0.173 |
| Iodide | 0.06 |
| Barium | less than 0.014 |
| Iron | less than 0.001 |
| Manganese | less than 0.001 |
| Chromium | less than 0.001 |
| Cobalt | less than 0.001 |
| Copper | less than 0.001 |
| Nickel | less than 0.001 |
| Selenium | less than 0.001 |
| Vanadium | less than 0.002 |
| Zinc | less than 0.001 |
| Molybdenum | less than 0.01 |
| Aluminum | less than 0.001 |
| Lead | less than 0.001 |

-continued

| Species | Concentration (ppm) |
|---|---|
| Arsenic | less than 0.002 |
| Cadmium | less than 0.001 |
| Nitrate | 1.8 |
| Phosphate | 0.2 |

Example 2

This example provides exemplarily electrodialysis trains that can be utilized in accordance with some aspects of the invention.

Figure 10A:
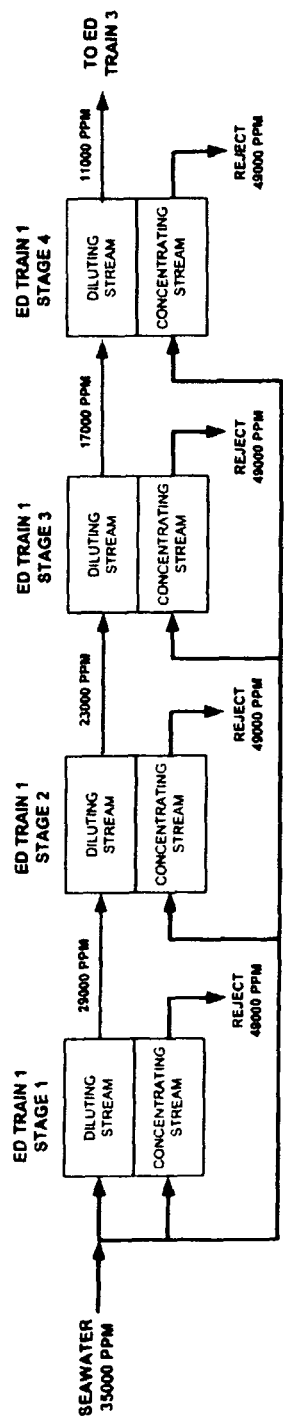
FIGS. 10A and 10B are schematic representations of electrodialysis trains that can be utilized in accordance with one or more aspects of the invention.

FIG. 10A exemplarily illustrates train of electrodialysis devices that can be used in the first train 220 of the first treatment stage. Train 220 can comprise multiple stages, each operating at optimum voltage and current density to minimize energy use. As illustrated, the train 220 can have four stages of electrodialysis devices.

In the first train, the depletion compartment can be serially connected and dilution streams are in series, with the product from one stage serving as a feed to downstream depletion compartments. Fresh seawater is used as feed to each of the associated concentrate compartments in each stage to minimize any concentration difference between the dilute and concentrate compartments in each stage.

Each stage can also have a number of ED modules operating in parallel.

Figure 10B:
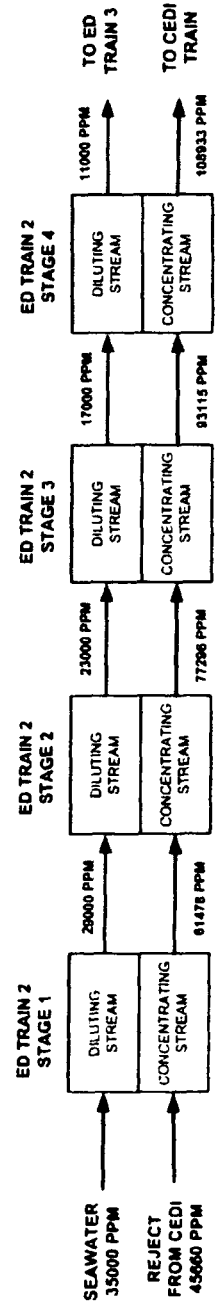

The second train 222 can also comprise multiple stages of electrodialysis devices, having serially connected depletion compartments. The respective depletion compartments can also be serially connected to increase the aggregate NaCl concentration in the brine stream therefrom to a salt content of about 10%. As illustrated in FIG. 10B, the second train 222 can have four electrodialysis stages, each of which preferably utilizes monovalent selective membranes.

The third train (not show) can also involve a plurality of electrodialysis stages to facilitate reducing the dissolved solids concentration of the water stream to be in a range of about 3,500 ppm to about 5,500 ppm.

Example 3

This example describes expected performance of a system utilizing the techniques of the invention as substantially represented in FIG. 3 with a device schematically illustrated in FIG. 4 for desalinating seawater at a rate of about 8,000 m³/hr.

Two trains of electrodialysis (ED) device were simulated with finite element calculations with a softener and an electrodeionization (EDI) device. Several stages were used in the finite element simulation; stages 1-5 were designed to generate a brine stream with at least 10% NaCl; and the final two stages were designed to reduce the dissolved solids concentration of the product stream by the softener and the electrodeionization device. Table 2 and 3A-3C below list the simulation parameters and calculated results. Table 4 summarizes the predicted energy requirement for the ED/EDI system.

Figure 7:
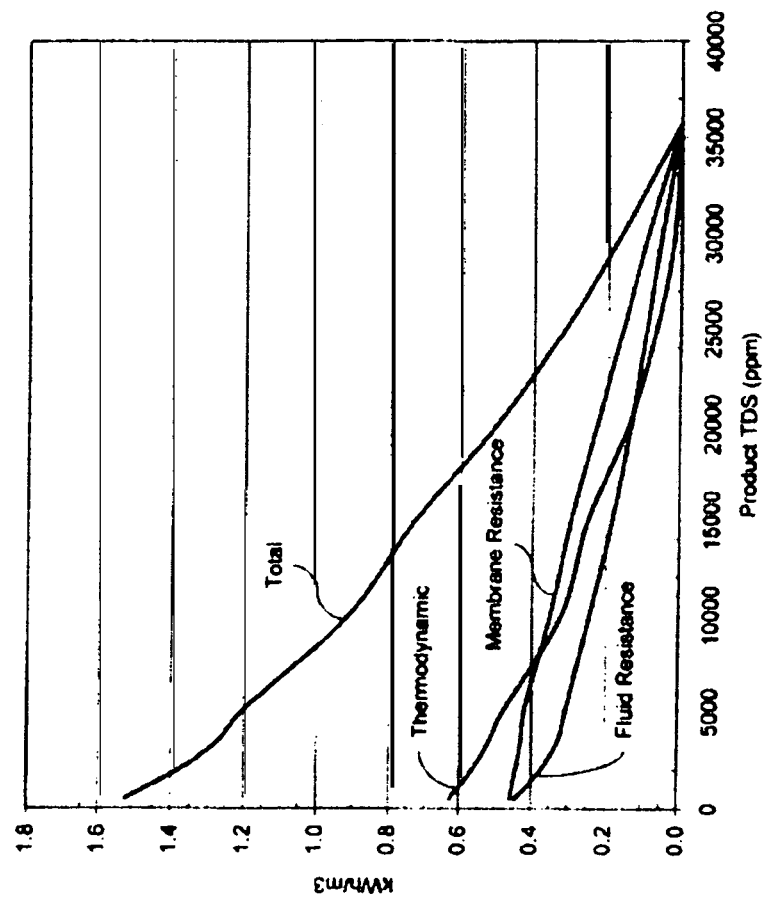
FIG. 7 is a graph illustrating the predicted energy requirements in accordance with one or more aspects of the invention.

FIG. 7 graphically illustrates the expected energy required in desalinating seawater to produce product water of various target characteristics.

The incoming sweater was assumed to have about 35,700 ppm total dissolved solids (TDS) after being pretreated with a 10 micron prefiltration (not shown) using commercially available pretreatment equipment. It is noted that extensive pretreatment, such as pretreatment typically associated with reverse osmosis systems is unnecessary for ED/CEDI process of the present invention because the water is not forced through the membrane in these processes.

The feed water is split into ED train 1, ED train 2 and a concentrate stream (brine) from ED train 2 is configured to feed to the CEDI train.

ED train 1 is passed through two stages to optimize the power utilization for each stage. Train 1 produces 2,500 ppm TDS quality product at about a 30% recovery. Standard electrodialysis modules are expected to be used in this train. The use of monovalent selective ion exchange membrane in stage 1 of this train should minimize the potential of scaling in the concentrate compartment.

ED train 2, stage 1 is designed to produce 10% NaCl (brine) solution in the concentrate stream. The brine will be used to regenerate the softener downstream and as one of the concentrating stream in the CEDI module. This Electrodialysis stage would utilize monovalent selective ion exchange membranes to produce 10% NaCl solution in the concentrating compartment. Stage 1 in ED train 2 would operate at about 70% recovery to produce the brine solution. ED Stage 2 has an estimated recovery of 48%. The overall recovery of ED train 2 is about 40%.

The at least partially treated product water has a TDS of about 2,500 ppm with high content of calcium, magnesium ions from the two trains. The at least partially treated water stream would be softened the softener or ion exchanging unit to exchange calcium and magnesium ions therein for sodium ions. The softened feed from the softener to the downstream CEDI train should not have a tendency to form scale during desalination to the target drinking water quality. The softener is periodically regenerated by the 10% brine solution supplied by ED train 2, stage 1.

The electrodeionization device provides transport of $Na^+$ and $Cl^-$ ions from the brine stream (10% NaCl) into a reject stream. Transport of counter-ions from the diluting stream into the reject stream should maintain electroneutrality. The net thermodynamic voltage across the streams is reduced because at least a portion of the DC voltage is generated by the half-cell pairs. Although not illustrated, any of the EDI reject streams can be recycled to the feed into the ED devices.

The effluent from the brine compartments can be discharged to a storage tank for use as a softener regenerant.

Some of the simulation parameters (TDS concentration and flow rates) include (with reference to FIGS. 2 and 3):

| Inlet | |
|---|---|
| Seawater inlet: | 35,700 ppm |
| | 25,277 m³/hr |
| First Treatment Stage | |
| First ED Train 220, First ED Device 321A and Second ED Device 322B | |
| Inlet seawater to depletion compartment 321D1: | 3,100 m³/hr |
| Inlet seawater to concentration compartment 321C1: | 5,167 m³/hr |
| Reject from compartment 321C1: | 49,929 ppm |

-continued

| | |
|---|---|
| Inlet to depletion compartment 322D2: | 10,000 ppm |
| | 3,100 m³/hr |
| Inlet seawater to concentration compartment 322C2: | 2,067 m³/hr |
| Reject from compartment 322C2: | 49,929 ppm |
| Product water 321 from compartment 322D2: | 2,500 ppm |
| Brine from ED train 222: | 99,500 ppm |

Second ED Train 222, Third ED Device 323A and Fourth ED Device 324B

| | |
|---|---|
| Inlet seawater to depletion compartment 323D1: | 4,900 m³/hr |
| Inlet seawater to concentration compartment 323C1: | 2,100 m³/hr |
| Outlet Brine from compartment 323C1: | 99,467 ppm (10% salinity) |
| Inlet to depletion compartment 324D2: | 10,000 ppm |
| Inlet seawater to concentration compartment 324C2: | 5,277 m³/hr |
| Reject from compartment 324C2: | 42,664 ppm |
| Outlet from compartment 324D2: | 2,500 ppm |

Second Stage

| | |
|---|---|
| Inlet to softener 330: | 2,500 ppm |

Third Treatment Stage
Electrodeionization device 340

| | |
|---|---|
| Inlet to depleting compartment 511: | 8,000 m³/hr |
| Inlet seawater to first concentrating compartment 541: | 2,667 m³/hr |
| Inlet to compartment 512 (brine): | 2,100 m³/hr (10% salinity) |
| Outlet brine from compartment 512: | 91,848 ppm |

Product

| | |
|---|---|
| Outlet from compartment 511: | 500 ppm |

TABLE 2

| | ED overall | ED/EDI overall |
|---|---|---|
| TDS in feed to product stream | 35,700 ppm | 35,700 ppm |
| TDS in feed to reject stream | 35,700 ppm | 35,700 ppm |
| Recovery | 39.9% | 32.9% |
| Flow rate per membrane area (flux) | 1.79 gfd<br>0.0030 m/hr | 1.60 gfd<br>0.0027 m/hr |
| Product TDS | 2,500 ppm | 500 ppm |
| Reject TDS - Stage 1 thru Stage 5 | 99,467 ppm | |
| Reject TDS - Stage 6 thru Stage 7 | 42,664 ppm | |
| Total power | 1,706 kW | 1,799 kW |
| Total energy required per unit product | 1.39 kWh/m³<br>5.27 kWh/Kgal | 1.47 kWh/m³<br>5.56 kWh/Kgal |
| Membrane area per flow rate | 0.560 ft²/gpd<br>329.9 m²/(m³/hr) | 0.627 ft²/gpd<br>369.1 m²/(m³/hr) |
| Product flow rate | 1,225 m³/hr | 1,225 m³/hr |
| Reject flow rate Stage 1 thru 5 | 525 m³/hr | |
| Reject flow rate Stage 6 and 7 | 1,319 m³/hr | |
| Reject flow rate, ED total | 1,844 m³/hr | |
| Reject flow rate, ED/EDI total | | 2,504 m³/hr |
| Total projected membrane area | 404,068 m² | 452,171 m² |

TABLE 3A

| | Stage 1 | Stage 2 | Stage 3 |
|---|---|---|---|
| TDS in feed to product stream | 35700 ppm | 30000 ppm | 25000 ppm |
| TDS in feed to reject stream | 35700 ppm | 52800 ppm | 64467 ppm |
| Total voltage drop per cell pair | 0.0584 Volt | 0.0632 Volt | 0.0744 Volt |
| Recovery | 75.0% | 70.0% | 70.0% |
| Flow rate per membrane area (flux) | 25.0 gfd<br>0.0174 gpm/ft²<br>0.0424 m/hr | 25.0 gfd<br>0.0174 gpm/ft²<br>0.0424 m/hr | 25.0 gfd<br>0.0174 gpm/ft²<br>0.0424 m/hr |
| Product TDS | 30000 ppm | 25000 ppm | 20000 ppm |
| Reject TDS | 52800 ppm | 64467 ppm | 76133 ppm |
| Total power | 196.7 kW | 186.8 kW | 220.1 kW |
| Total energy required per unit product | 0.161 kWh/m³<br>0.61 kWh/Kgal | 0.153 kWh/m³<br>0.58 kWh/Kgal | 0.180 kWh/m³<br>0.68 kWh/Kgal |
| Membrane area per flow rate | 0.04 ft²/gpd<br>23.56 m²/(m³/hr) | 0.04 ft²/gpd<br>23.56 m²/(m³/hr) | 0.04 ft²/gpd<br>23.56 m²/(m³/hr) |
| Product flow rate | 1225 m³/hr | 1225 m³/hr | 1225 m³/hr |
| Reject flow rate | 408 m³/hr | 525 m³/hr | 525 m³/hr |

TABLE 3A-continued

| | Stage | | |
|---|---|---|---|
| | 1 | 2 | 3 |
| Total projected cation membrane area | 28862 m$^2$ | 28862 m$^2$ | 28862 m$^2$ |
| Total projected anion membrane area | 28862 m$^2$ | 28862 m$^2$ | 28862 m$^2$ |
| Total projected membrane area | 57724 m$^2$ | 57724 m$^2$ | 57724 m$^2$ |

TABLE 3B

| | Stage | | |
|---|---|---|---|
| | 4 | 5 | 6 |
| TDS in feed to product stream | 20000 ppm | 15000 ppm | 10000 ppm |
| TDS in feed to reject stream | 76133 ppm | 87800 ppm | 35700 ppm |
| Total voltage drop per cell pair | 0.0892 Volt | 0.1110 Volt | 0.1160 Volt |
| Recovery | 70.0% | 70.0% | 65.0% |
| Flow rate per membrane area (flux) | 25.0 gfd | 25.0 gfd | 25.0 gfd |
| | 0.0174 gpm/ft$^2$ | 0.0174 gpm/ft$^2$ | 0.0174 gpm/ft$^2$ |
| | 0.0424 m/hr | 0.0424 m/hr | 0.0424 m/hr |
| Product TDS | 15000 ppm | 10000 ppm | 5000 ppm |
| Reject TDS | 87800 ppm | 99467 ppm | 44986 ppm |
| Total power | 263.8 kW | 328.2 kW | 342.9 kW |
| Total energy required per unit product | 0.215 kWh/m$^3$ | 0.268 kWh/m$^3$ | 0.280 kWh/m$^3$ |
| | 0.82 kWh/Kgal | 1.01 kWh/Kgal | 1.06 kWh/Kgal |
| Membrane area per flow rate | 0.04 ft$^2$/gpd | 0.04 ft$^2$/gpd | 0.04 ft$^2$/gpd |
| | 23.56 m$^2$/(m$^3$/hr) | 23.56 m$^2$/(m$^3$/hr) | 23.56 m$^2$/(m$^3$/hr) |
| Product flow rate | 1225 m$^3$/hr | 1225 m$^3$/hr | 1225 m$^3$/hr |
| Reject flow rate | 525 m$^3$/hr | 525 m$^3$/hr | 660 m$^3$/hr |
| Total projected cation membrane area | 28862 m$^2$ | 28862 m$^2$ | 28862 m$^2$ |
| Total projected anion membrane area | 28862 m$^2$ | 28862 m$^2$ | 28862 m$^2$ |
| Total projected membrane area | 57724 m$^2$ | 57724 m$^2$ | 57724 m$^2$ |

TABLE 3C

| | Stage | |
|---|---|---|
| | 7 | EDI |
| TDS in feed to product stream | 5000 ppm | 2500 ppm |
| TDS in feed to reject stream | 35700 ppm | 35700 ppm |
| Total voltage drop per cell pair | 0.1133 Volt | 0.0788 Volt |
| Recovery | 65.0% | 70.0% |
| Flow rate per membrane area (flux) | 25.0 gfd | 60.0 gfd |
| | 0.0174 gpm/ft$^2$ | 0.0417 gpm/ft$^2$ |
| | 0.0424 m/hr | 0.1019 m/hr |
| Product TDS | 2500 ppm | 500 ppm |
| Reject TDS | 40343 ppm | 40367 ppm |
| Total power | 167.5 kW | 93.2 kW |
| Total energy required | 0.137 kWh/m$^3$ | 0.076 kWh/m$^3$ |
| per unit product | 0.52 kWh/Kgal | 0.29 kWh/Kgal |
| Membrane area per flow rate | 0.04 ft$^2$/gpd | 0.02 ft$^2$/gpd |
| | 23.56 m$^2$/(m$^3$/hr) | 9.82 m$^2$/(m$^3$/hr) |
| Product flow rate | 1225 m$^3$/hr | 1225 m$^3$/hr |
| Reject flow rate | 660 m$^3$/hr | 525 m$^3$/hr |
| Total projected cation membrane area | 28862 m$^2$ | 24052 m$^2$ |
| Total projected anion membrane area | 28862 m$^2$ | 24052 m$^2$ |
| Total projected membrane area | 57724 m$^2$ | 48103 m$^2$ |

TABLE 4

| | ED Train 1 | ED Train 2 | Combined ED Stages | EDI Stage | Combined ED and EDI |
|---|---|---|---|---|---|
| Product Flowrate, m$^3$/hr | | | | | 8,000 |

TABLE 4-continued

|  | ED Train 1 | ED Train 2 | Combined ED Stages | EDI Stage | Combined ED and EDI |
|---|---|---|---|---|---|
| Power Requirement, kW | 3,938 | 6,824 | 10,762 | 628 | 11,390 |
| Energy Requirement per cubic meter of product, kW/m³ | 0.492 | 0.853 | 1.345 | 0.079 | 1.424 |

Example 4

Figure 8:
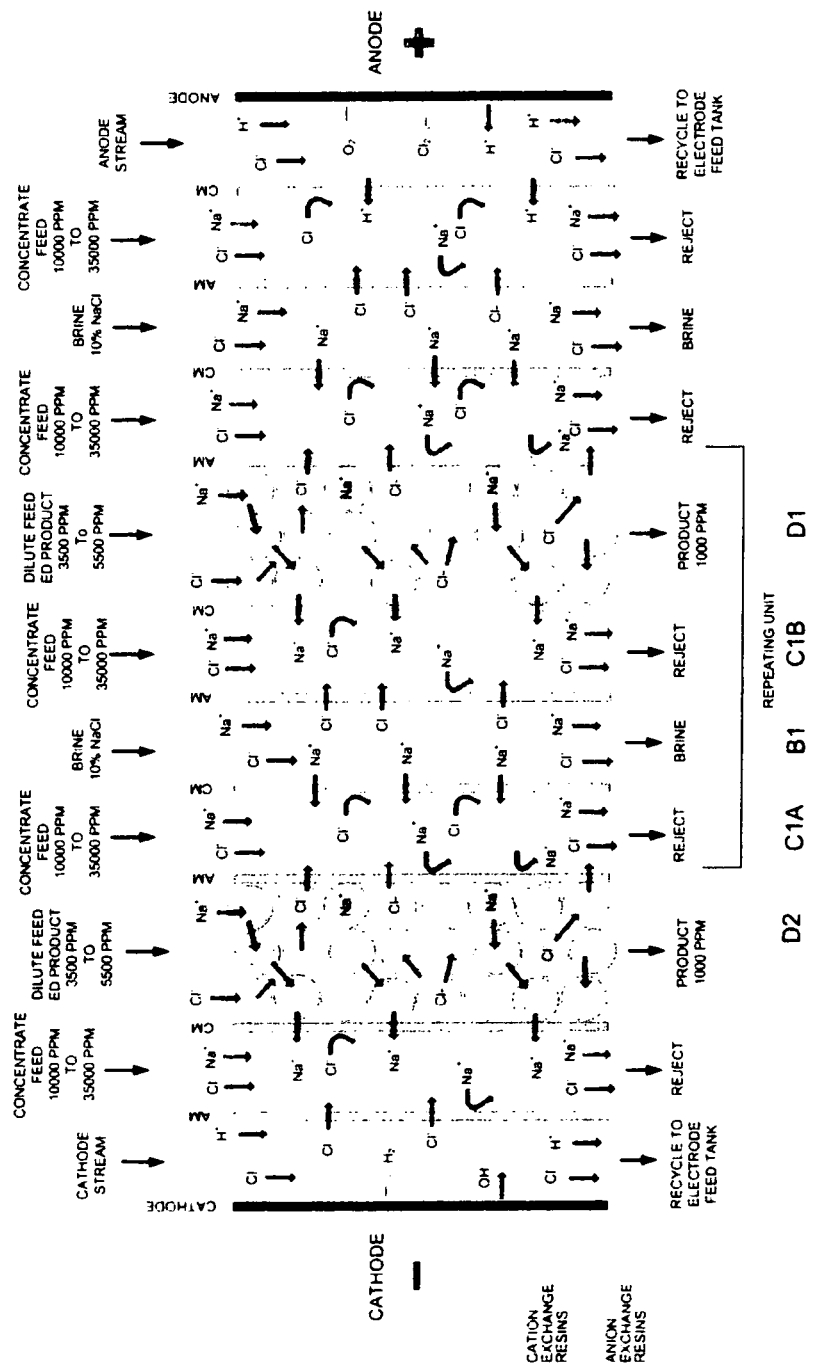
FIG. 8 is a schematic representation of a Donnan-enhanced electrodeionization (EDI) module in accordance with one or more aspects of the invention.

This example describes a Donnan-enhanced EDI device in accordance with one or more aspects of the invention. FIG. 8 shows a schematic of the Donnan-enhanced EDI process, with four cells identified as the "repeating unit" in a module.

In the absence of an applied electric field, anions in the brine stream B1 are transferred towards the concentrating stream C1B on the right across the separating anion exchange membrane due to concentration difference between the brine and concentrating streams. To maintain electroneutrality, an equivalent amount of cationic species, on a charge basis, would typically migrate from the diluting stream D1 into the concentrating stream C1B, across the cation selective membrane CM. Similarly, cationic species typically migrate from the brine stream B1 into the concentrating stream C1A across another cation selective membrane CM. To maintain electroneutrality, anionic species typically migrate from the diluting stream D2 into the concentrating stream C1A, across the anion selective membrane AM. In effect, transfer of ions from a brine stream into the adjacent concentrating streams due to concentration difference can be considered as promoting migration of ionic species from the diluting streams to the concentrating streams to maintain electroneutrality. The diluting streams are therefore deionized.

If a direct current DC electric field is applied, the ionic transfer due to the electric field can be augmented by the ionic migration phenomena due to the concentration difference between the brine and adjacent concentrating streams in a process referred to as Donnan-enhanced EDI, which is based on the Donnan potential that arises as a result of a concentration difference of ions across an ion exchange membrane permeable to those ions.

Example 5

This example describes alternative configurations of the treatment system and techniques of the invention, utilizing ED devices, with softening and EDI devices to desalinate brackish and seawater.

Figure 9A:
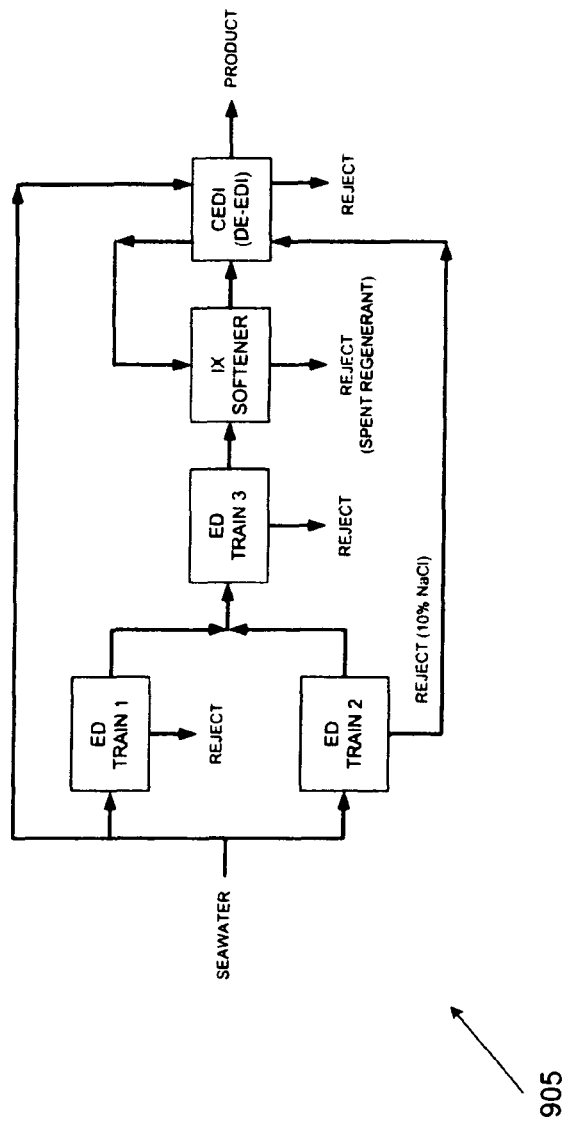
FIGS. 9A and 9B are schematic representations of a system in accordance with one or more aspects of the invention.
Figure 9B:
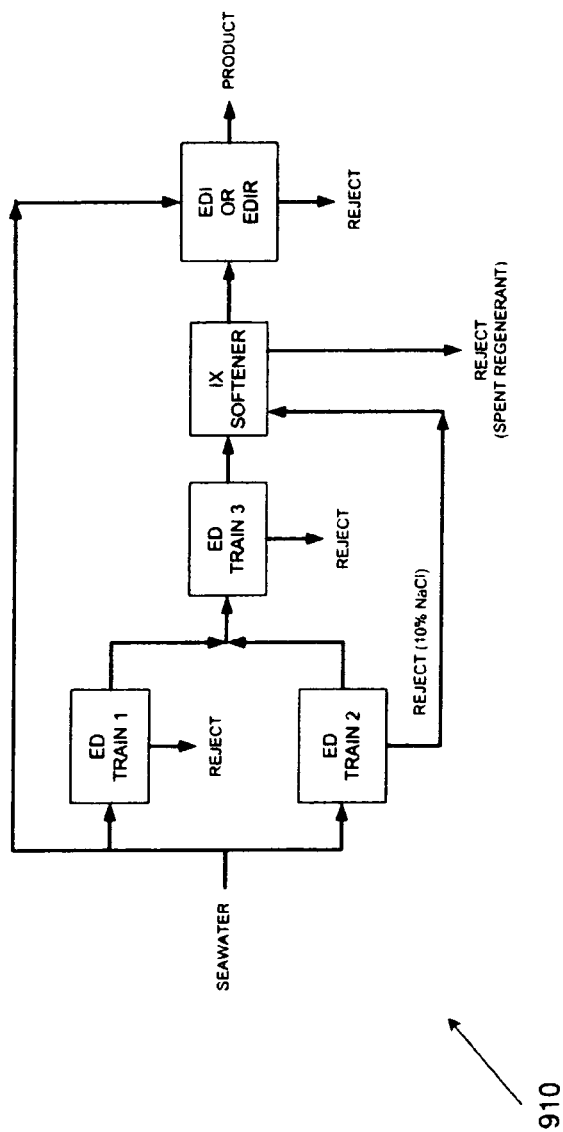

FIGS. 9 and 9B show further embodiments of the treatment system in accordance with one or more aspects of the invention. In contrast to the system illustrated in FIG. 2, the treatment system 905 further utilizes a third train electrodialysis units ED TRAIN 3 disposed to receive the at least partially treated water and further treat the water stream by removing at least a portion of target species before ion exchange and further treatment in the third treatment stage which can be a Donnan-enhanced electrodeionization device (DE-EDI). FIG. 9B shows another exemplary treatment system 910 that also utilizes a third train electrodialysis units ED TRAIN 3, which is also disposed to receive the at least partially treated water and further treat the water stream, but instead utilizes a conventional EDI without a brine stream, or an EDI with polarity and flow reversal (EDIR), rather than an DE-EDI device.

The EDI R device is disposed downstream from the IX softener and may tolerate higher hardness feed streams which can allow lower softener hardness removal, or higher hardness breakthrough before regeneration. Higher breakthrough conditions would increase the time between IX softener unit regenerations and may also reduce the size and capital and operating cost of the softeners.

Further variation or modifications of the systems of FIGS. 9A and 9B may involve, for example, disposing the LX softener before ED TRAIN 3.

Such systems may be utilized to desalinate seawater as well as brackish water from estuaries, rivers and/or even groundwater.

Example 6

In this example, desalination experiments were performed using electrodialysis modules which had either standard or monovalent selective membranes. The initial feed solution was either an about 35,000 ppm NaCl solution or synthetic seawater with about 35,000 ppm total dissolved solids (TDS).

Figure 11A:
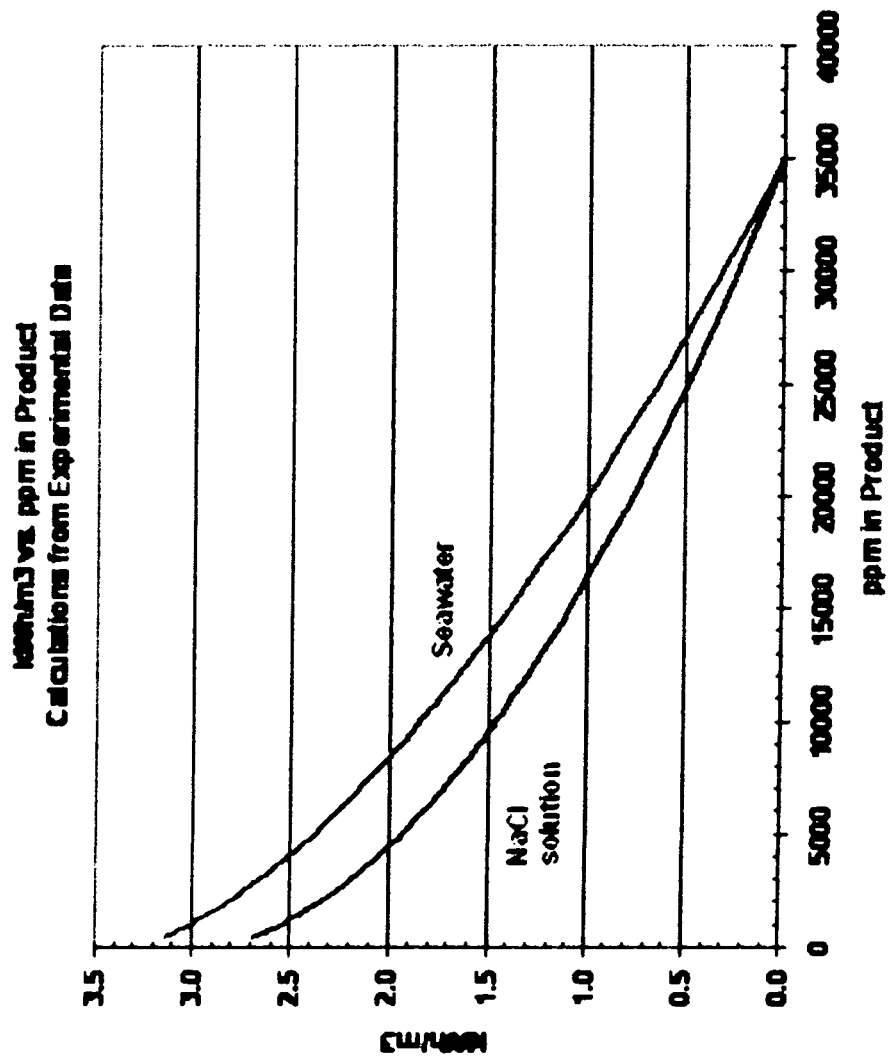
FIGS. 11A and 11B are graphs showing the energy required in treating synthetic saltwater ("NaCl solution") and seawater relative to target product total dissolved solids concentration, utilizing electrodialysis devices with standard ion selective membranes (FIG. 11A) and monoselective membranes (FIG. 11B) in accordance with one or more aspects of the invention.
Figure 11B:
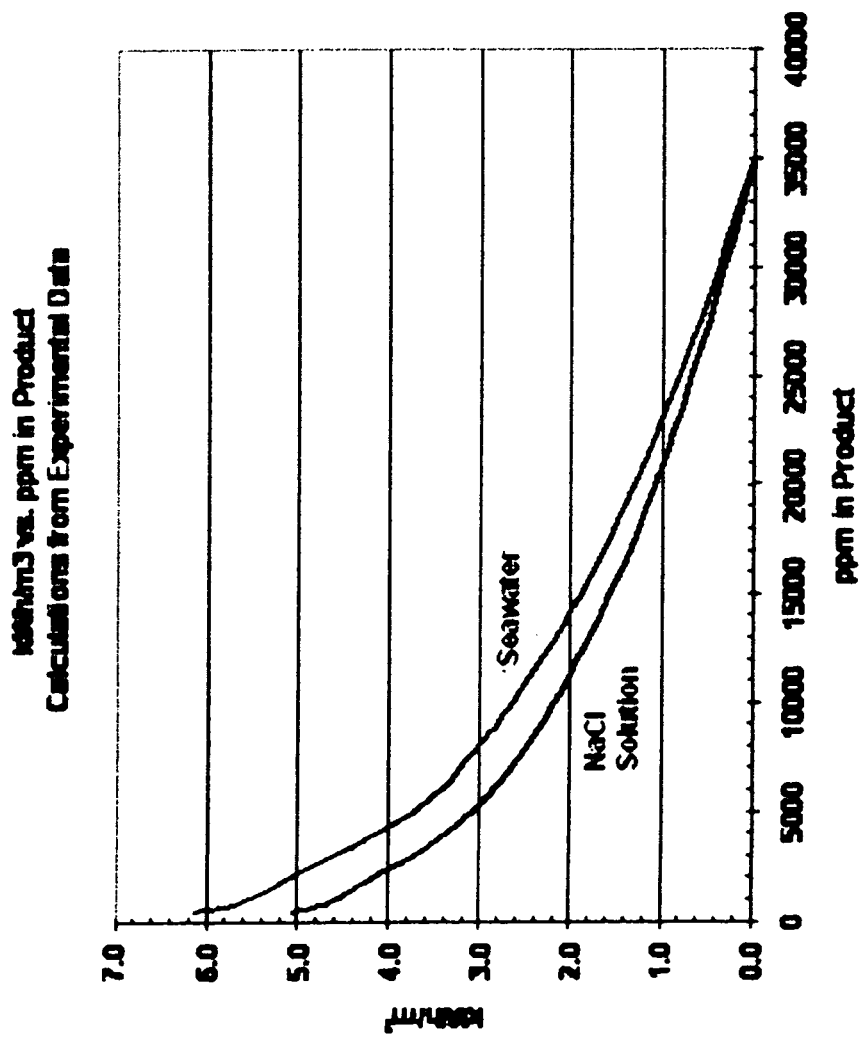
Figure 12A:
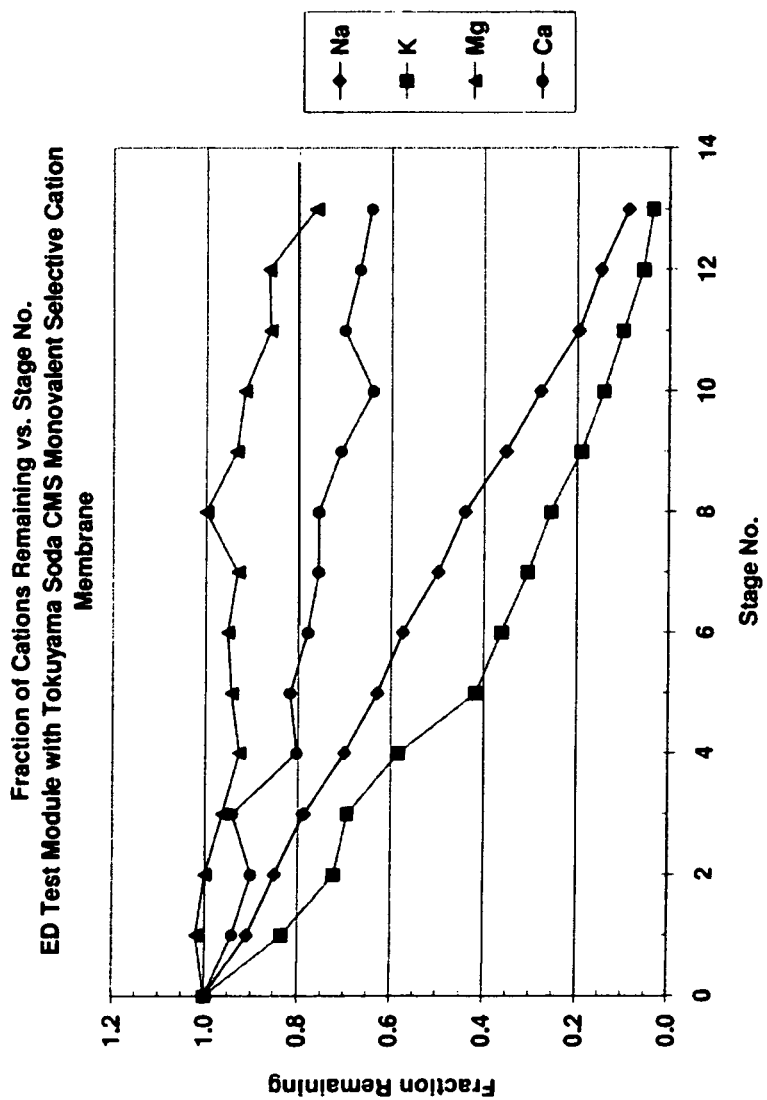
FIGS. 12A and 12B are graphs showing the fractions of cations (FIG. 12A) and anions (FIG. 12B) during treatment of seawater relative to electrodialysis stages utilizing monoselective membranes, in accordance with one or more aspects of the invention.
Figure 12B:
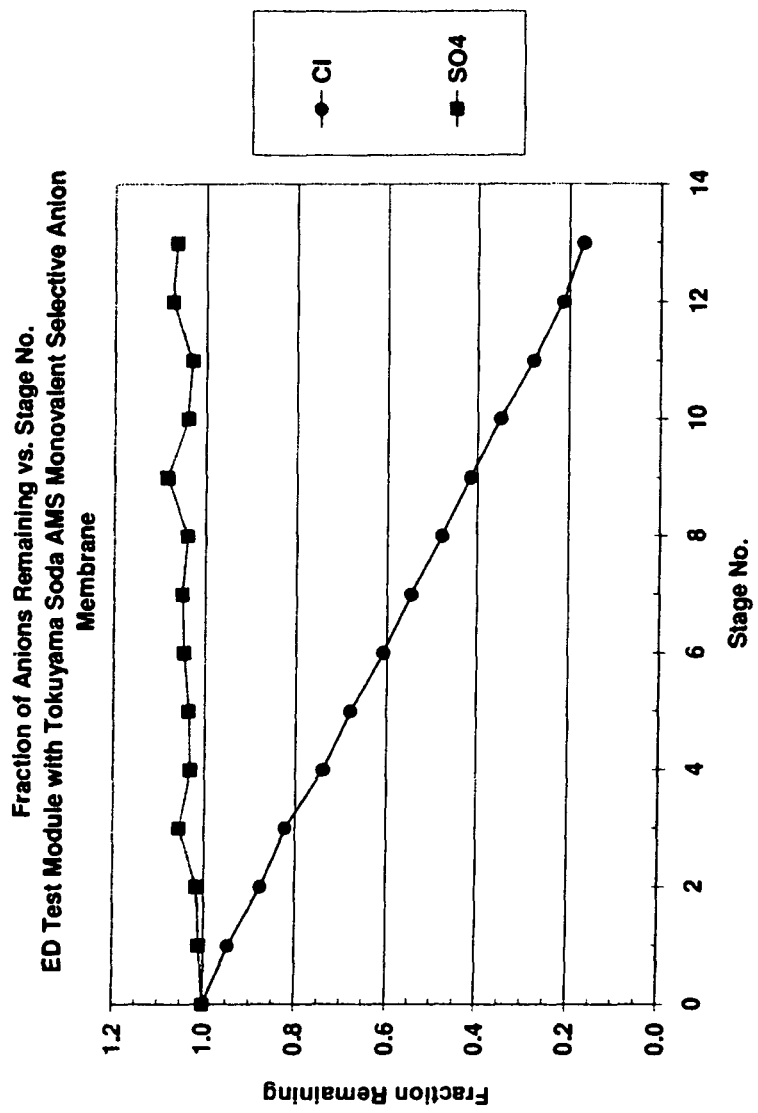

FIGS. 11A and 11B show the calculated energy required per m³ of ED product as the target concentration in the product stream was reduced from about 35,000 ppm to about 500 ppm, using standard ion selective membranes (FIG. 11A) and monovalent selective membranes (FIG. 11A). The monovalent selective membranes used were the CMS cation selective membrane and the AMS anion selective membrane from Tokuyama Soda Co., Tokyo, Japan. FIGS. 12A and 12B shows the fractions cationic species (FIG. 12A) and anionic species (FIG. 12B) remaining relative to electrodialysis stages utilizing monovalent selective membranes.

For both types of ED modules, the energy consumption is higher when the feed is synthetic seawater. The ratio of energy consumption for seawater compared to the synthetic NaCl solution range from 17%-32% for an ED module with standard membranes and 21% for an ED module with monovalent selective membranes.

The energy consumption is much higher for an ED module with monovalent membranes, almost twice that of an ED module with standard membranes.

The energy consumption increased steeply as the target product TDS was reduced below about 5,000 ppm.

Seawater contains divalent ions such as $Ca^{+2}$, $Mg^{+2}$, and $SO_4^{-2}$ in addition to NaCl, as shown listed above in Example 1, which can affect the divalent ions energy consumption, as illustrated with the data between seawater vs. and synthetic NaCl solution.

Because monovalent selective membranes preferentially allow passage of monovalent ions relative to divalent ions, it is believed that the that the ratio of concentrations of divalent to monovalent ions in the diluting compartments would increase as seawater is desalinated in a series of ED modules. FIGS. 12A and 12B show the fraction of ions remaining in an experiment with ED modules with monovalent selective membranes. The data show that the membranes retard passage of divalent ions relative to monovalent ions. The selectivity of the anion membrane is almost 100%, which is consistent with published data on the Tokuyama Soda monovalent selective anion membranes. A perfectly selective anion membrane would result in no transfer of $SO_4$ ions and therefore the amount of $SO_4$ ions remaining would remain at 100%. It is believed that the increase in $SO_4$ concentration is due to a electroosmosis phenomena, whereby water is also transported through the membranes.

Based on FIGS. 12A and 12B, it is believed that the higher energy consumption in ED modules with monovalent selective membranes is due to the increase in ratio of concentrations of divalent to monovalent ions. It is also expected that removal of divalent ions in the feed water, particularly $SO_4$, would reduce the energy consumption in both ED and EDI modules. Removal of divalent ions as part of the pretreatment to the ED step by nanofiltration (NF), for example, would reduce the energy consumption of both ED and the EDI step. The NF product would therefore contain primarily NaCl and KCl at a lower concentration than the starting seawater and would require less energy to desalinate to 500 ppm. Thus, in some configurations of the invention, NF operations as a pressure driven process can be utilized to facilitate recovery, and the energy spent and remaining in the NF reject would further reduce the system energy consumption. Energy recovery devices, originally developed for reverse osmosis (RO), are believed to be applicable also to NF unit operations.

Alternatively, a salt regenerated anion exchange step ahead of the ED devices or between the ED and the EDI devices would also reduce the overall energy consumption.

Some aspects of the present invention provide systems and techniques of seawater desalination through electrically driven processes. Transfer of ions facilitated by an electrical potential is described as a relatively efficient process because the resistance to ion movement is limited by the membranes that are used to separate purified water from the waste/concentrated water. Additional features and aspects of the invention can pretreatment operation as described herein.

Having now described some illustrative embodiments of the invention, it should be apparent to those skilled in the art that the foregoing is merely illustrative and not limiting, having been presented by way of example only. Indeed, some exemplary configurations of the device, systems, and techniques of the invention and particular components implemented in such configurations are considered a part of the present disclosure. For example, each of the unit operations when described herein as being connectable or being connected, such as fluidly connected, involve respective inlet and outlet ports that provide such connectivity. Non-limiting examples of connecting structures include pipes and threaded or welded flanges secured by bolts and nuts, and typically sealed with gaskets. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name but for use of the ordinal term to distinguish the claim elements.

What is claimed is:

1. A water treatment device for treating a feed water having a first concentration of dissolved ionic species therein, comprising:
a first depleting compartment fluidly connected to a source of the feed water, and at least partially defined by a first anion selective membrane and a first cation selective membrane;
a first concentrating compartment fluidly connected to a source of a first aqueous solution having a second concentration of the dissolved ionic species therein, the first concentrating compartment in ionic communication with the first depleting compartment through one of the first anion selective membrane and the first cation selective membrane;
a second depleting compartment fluidly connected to a source of a second aqueous solution having a third concentration of the dissolved ionic species that is greater than the first concentration of the dissolved ionic species, the second depleting compartment in ionic communication with the first concentrating compartment through one of a second cation selective membrane and a second anion selective membrane;
a second concentrating compartment fluidly connected to at least one of a source of a third aqueous solution having a fourth concentration of the dissolved ionic species that is less than the third concentration of the dissolved ionic species and the second concentration of the dissolved ionic species, the second concentrating compartment in ionic communication with the second depleting compartment through one of the second anion selective membrane and the second cation selective membrane; and a third depleting compartment fluidly connected to at least one of the source of the second aqueous solution and a source of a fourth aqueous solution compositionally similar to the feed water and having a fifth concentration of the dissolved ionic species that is greater than the second concentration of dissolved ionic species, the third depleting compartment in ionic communication with the second concentrating compartment through a third cation selective membrane.

2. The device of claim 1, wherein the second concentrating compartment is in ionic communication with the first depleting compartment through the first cation selective membrane.

3. The device of claim 1, further comprising a salt bridge ionically connecting the first depleting compartment and the second concentrating compartment.

4. The device of claim 1, further comprising a third concentrating compartment fluidly connected to at least one of a source of the first aqueous solution, the source of the third aqueous solution, and a source of a fifth aqueous solution having a sixth concentration of the dissolved ionic species that is less than any of the third concentration of dissolved ionic species and the fifth concentration of dissolved ionic species, the third concentrating compartment in ionic communication with the third depleting compartment through a third anion selective membrane.

5. The device of claim 4, wherein the third concentrating compartment is in ionic communication with the first depleting compartment through the first cation selective membrane.

6. The device of claim 5, wherein the third concentrating compartment is in ionic communication with the first depleting compartment through a salt bridge.

7. The device of claim 1 having no electrodes.

8. The device of claim 1, wherein the first depleting compartment and the first concentrating compartment are fluidly connected downstream from the same source.

* * * * *